United States Patent
Aiso

(10) Patent No.: US 7,080,130 B2
(45) Date of Patent: Jul. 18, 2006

(54) APPARATUS AND METHOD SUPPORTING OPERATION OF SERVER BASED ON ACCESS STATUS TO SERVER AND COMPUTER-READABLE RECORDING MEDIUM RECORDED WITH PROGRAM REALIZING SUCH METHOD

(75) Inventor: Tomohiro Aiso, Daito (JP)

(73) Assignee: Sharp Kabushiki Kaisha, Osaka (JP)

( * ) Notice: Subject to any disclaimer, the term of this patent is extended or adjusted under 35 U.S.C. 154(b) by 772 days.

(21) Appl. No.: 09/867,532

(22) Filed: May 31, 2001

(65) Prior Publication Data

US 2001/0056465 A1  Dec. 27, 2001

(30) Foreign Application Priority Data

Jun. 16, 2000 (JP) ............................. 2000-182049

(51) Int. Cl.
G06F 15/16 (2006.01)
(52) U.S. Cl. ..................... 709/217; 709/218; 709/219
(58) Field of Classification Search ............... 709/203, 709/204, 217–219; 705/14, 26, 27
See application file for complete search history.

(56) References Cited

U.S. PATENT DOCUMENTS

| | | | |
|---|---|---|---|
| 5,754,939 A | 5/1998 | Herz et al. | |
| 5,828,839 A | 10/1998 | Moncreiff | |
| 5,872,850 A | 2/1999 | Klein et al. | |
| 5,963,951 A | 10/1999 | Collins | |
| 6,020,884 A | 2/2000 | MacNaughton et al. | |
| 6,182,050 B1 * | 1/2001 | Ballard ........................ | 709/218 |
| 6,487,538 B1 * | 11/2002 | Gupta et al. ................. | 709/219 |
| 6,757,661 B1 * | 6/2004 | Blaser et al. .................. | 705/14 |
| 6,763,334 B1 * | 7/2004 | Matsumoto et al. .......... | 705/14 |

FOREIGN PATENT DOCUMENTS

| | | |
|---|---|---|
| JP | 3-30543 | 2/1991 |
| JP | 3-162033 | 7/1991 |
| JP | 5-61913 | 3/1993 |
| JP | 8-163160 | 6/1996 |
| JP | 10-240828 | 9/1998 |
| JP | 11-3348 | 1/1999 |
| JP | 11-45279 | 2/1999 |
| JP | 11-203326 | 7/1999 |
| WO | WO 96/24213 | 8/1996 |

* cited by examiner

*Primary Examiner*—Jeffrey Pwu
(74) *Attorney, Agent, or Firm*—Nixon & Vanderhye

(57) ABSTRACT

An operation support apparatus supports an operation of a server that operates an electronic conference system or the like. The apparatus includes a message management unit transmitting and receiving information with respect to a plurality of client computers including a first client computer, a user information storage unit storing a transmission destination of a first client computer, a conference monitor unit detecting an access status of a client computer to the server, and a general user notification unit transmitting information based on an access status to the first client computer when the access status of a client computer to the server detected by the conference monitor unit satisfies a predetermined condition.

31 Claims, 24 Drawing Sheets

| ADVERTISEMENT INSERTION CONDITION | ACTIVITY | ADVERTISING FEE (PER ONE MINUTE) | |
|---|---|---|---|
| A | NUMBER OF PRESENTED MESSAGES $\geq$ P1<br>NUMBER OF TIMES MESSAGE REFERRED TO $\geq$ Q1<br>NUMBER OF PARTICIPANTS $\geq$ R1 | X 1 | |
| B | NUMBER OF PRESENTED MESSAGES $\geq$ P2<br>NUMBER OF TIMES MESSAGE REFERRED TO $\geq$ Q2<br>NUMBER OF PARTICIPANTS $\geq$ R2 | X 2 | |
| C | NUMBER OF PRESENTED MESSAGES $\geq$ P3<br>NUMBER OF TIMES MESSAGE REFERRED TO $\geq$ Q3<br>NUMBER OF PARTICIPANTS $\geq$ R3 | X 3 | $P1 > P2 > P3$<br>$Q1 > Q2 > Q3$<br>$R1 > R2 > R3$<br>$X1 > X2 > X3$ |

FIG.3

| USER ID | PASSWORD | MAIL ADDRESS | SEX | AGE |
|---|---|---|---|---|
| matu | ******** | matu@hoge.ne.jp | MALE | 21 |
| take | ******** | 09001234567@hogehoge.ne.jp | FEMALE | 17 |
| ume | ******** | 09076543210@humuhumu.ne.jp | FEMALE | 25 |
| sugi | ******** | sugi@foo.ne.jp | MALE | 31 |
| ⋮ | ⋮ | ⋮ | ⋮ | ⋮ |

FIG.4

| USER ID | CONFERENCE HALL OF INTEREST ID | NOTIFICATION TIME | NUMBER OF PRESENTED MESSAGES | NUMBER OF PARTICIPANTS IN CONFERENCE |
|---|---|---|---|---|
| matu | 2 | 2000/03/02 19:39 | 10~ | 5~10 |
| matu | 5 | — | 20~ | 5~ |
| take | 3 | 2000/03/01 11:27 | 10~ | 2~5 |
| take | 6 | — | 20~ | 5~ |
| sugi | 2 | — | 15~ | 10~ |
| ⋮ | ⋮ | ⋮ | ⋮ | ⋮ |

FIG.5

| USER ID | KEYWORD OF INTEREST | NOTIFICATION TIME |
|---|---|---|
| matu | Java | 2000/03/03 15:35 |
| matu | Bean | — |
| take | OS | 2000/03/03 18:34 |
| take | WindowsNT | — |
| ume | Java | 2000/03/03 15:35 |
| ⋮ | ⋮ | ⋮ |

FIG.7

| CONFERENCE HALL ID | MESSAGE ID | TITLE | MAIN TEXT | NAME OF PRESENTER | PRESENTED DATE | |
|---|---|---|---|---|---|---|
| 1 | 1 | FOR Servlet | ... | sakura | 2000/03/01 | 15:30 |
| 1 | 2 | Re: FOR Servlet | ... | matu | 2000/03/01 | 16:00 |
| 1 | 3 | Re: FOR Servlet | ... | kiku | 2000/03/01 | 16:30 |
| 2 | 4 | CLASSIFICATION METHOD | ... | uri | 2000/03/02 | 19:00 |
| 2 | 5 | Re: CLASSIFICATION METHOD | ... | tubaki | 2000/03/02 | 19:30 |
| 2 | 6 | Re: CLASSIFICATION METHOD | ... | take | 2000/03/02 | 19:32 |
| 2 | 7 | Re: CLASSIFICATION METHOD | ... | uri | 2000/03/02 | 19:35 |
| 2 | 8 | Re: CLASSIFICATION METHOD | ... | suisen | 2000/03/02 | 19:39 |
| ... | ... | ... | ... | ... | ... | |

FIG.8

| CONFERENCE HALL ID | ADVERTISEMENT INSERTION PROCESSING FLAG | NUMBER OF PRESENTED MESSAGES | NUMBER OF TIMES MESSAGE IS REFERRED TO | CURRENT STATUS ||||||||||
|---|---|---|---|---|---|---|---|---|---|---|---|---|
| | | | | NUMBER OF PARTICIPANTS UPPER ROW MALE, LOWER ROW FEMALE |||||||||
| | | | | TOTAL NUMBER | ~9 AGE | ~19 AGE | ~29 AGE | ~39 AGE | ~49 AGE | ~59 AGE | 60 AGE~ |
| 1 | SET | 12 | 23 | 9 | 0 | 1 | 3 | 2 | 3 | 0 | 0 |
| | | | | 9 | 0 | 2 | 4 | 2 | 1 | 0 | 0 |
| 2 | RESET | 11 | 21 | 7 | 0 | 1 | 5 | 1 | 0 | 0 | 0 |
| | | | | 8 | 0 | 2 | 4 | 2 | 0 | 0 | 0 |
| 3 | RESET | 9 | 11 | 7 | 0 | 3 | 1 | 3 | 0 | 0 | 0 |
| | | | | 11 | 0 | 2 | 1 | 4 | 1 | 3 | 0 |
| 4 | SET | 3 | 4 | 12 | 0 | 3 | 0 | 7 | 0 | 1 | 1 |
| | | | | 6 | 0 | 0 | 0 | 6 | 0 | 0 | 0 |
| 5 | RESET | 0 | 3 | 5 | 0 | 0 | 2 | 2 | 1 | 0 | 0 |
| | | | | 4 | 1 | 3 | 0 | 0 | 0 | 0 | 0 |
| ... | ... | ... | ... | ... | ... | ... | ... | ... | ... | ... | ... |

FIG.9

| ADVERTISER ID | PASSWORD | MAIL ADDRESS |
|---|---|---|
| 1 | ******** | zou@hoge.ne.jp |
| 2 | ******** | saru@hogehoge.ne.jp |
| 3 | ******** | tota@humuhumu.ne.jp |
| 4 | ******** | tanuki@foo.ne.jp |
| ⋮ | ⋮ | ⋮ |

FIG. 10

| CONFERENCE HALL ID | ADVERTISER ID | ADVERTISEMENT PERIOD | ADVERTISEMENT INSERTION CONDITION | URL | FIRST ADVERTISEMENT TEXT DATA | SECOND ADVERTISEMENT TEXT DATA | THIRD ADVERTISEMENT TEXT DATA | AUTOMATION FLAG | ADVERTISEMENT INSERTED DURATION |
|---|---|---|---|---|---|---|---|---|---|
| 3 | 1 | 2000/03/06-2000/03/12 | C | http://www.elephant ... | | | ... | 1 | 10 |
| 3 | 2 | 2000/03/13-2000/03/19 | A,B | http://www.monkey ... | | | ... | 0 | 20 |
| 3 | 3 | 2000/03/20-2000/03/26 | B | http://www.tiger ... | BANQUET AT ○○. CLICK RIGHT NOW FOR RESERVATION!! | BANQUET AT ○○. BEER SERVED AT HALF PRICE!! | NEW LUNCH MENU. ○○ | 0 | 15 |
| 3 | 4 | 2000/03/27-2000/04/02 | A,B,C | http://www.lion ... | | | ... | 0 | 10 |
| 3 | 5 | 2000/04/03-2000/04/09 | A | http://www.sheep ... | | | ... | 1 | 20 |
| 6 | 12 | 2000/03/20-2000/03/26 | C | http://www.pegasus ... | | | ... | 1 | 10 |
| ... | ... | ... | ... | ... | ... | ... | ... | ... | ... |

FIG.11

| CONFERENCE HALL ID | ADVERTISER ID | ADVERTISEMENT INSERTION CONDITION | URL | FIRST ADVERTISEMENT TEXT DATA | SECOND ADVERTISEMENT TEXT DATA | THIRD ADVERTISEMENT TEXT DATA | ADVERTISEMENT INSERTED DURATION |
|---|---|---|---|---|---|---|---|
| 4 | 6 | C | http://www.koala | ... | ... | ... | 10 |
| — | 7 | A,B | http://www.deer | ... | ... | ... | 20 |
| — | 8 | B | http://www.panther | ... | ... | ... | 15 |
| — | 9 | A,B | http://www.cheetah | ... | ... | ... | 20 |
| 4 | 10 | A | http://www.wolf | ... | ... | ... | 20 |
| 5 | 11 | C | http://www.raccoon | ... | ... | ... | 15 |
| ... | ... | ... | ... | ... | ... | ... | ... |

FIG.12

| ADVERTISEMENT INSERTION CONDITION | ACTIVITY | ADVERTISING FEE (PER ONE MINUTE) |
|---|---|---|
| A | NUMBER OF PRESENTED MESSAGES ≧ P1<br>NUMBER OF TIMES MESSAGE REFERRED TO ≧ Q1<br>NUMBER OF PARTICIPANTS ≧ R1 | X 1 |
| B | NUMBER OF PRESENTED MESSAGES ≧ P2<br>NUMBER OF TIMES MESSAGE REFERRED TO ≧ Q2<br>NUMBER OF PARTICIPANTS ≧ R2 | X 2 |
| C | NUMBER OF PRESENTED MESSAGES ≧ P3<br>NUMBER OF TIMES MESSAGE REFERRED TO ≧ Q3<br>NUMBER OF PARTICIPANTS ≧ R3 | X 3 |

| TIME MANAGEMENT ID | TIME | SUBJECT | SET TIME |
|---|---|---|---|
| 1 | 10:05 | INSERTION REQUEST MAIL TIME OUT PROCESSING UNIT | REPLY WAITING TIME LIMIT OF ADVERTISEMENT INSERTION CONFIRMATION MAIL (ID = 1) |
| 2 | 10:12 | INSERTION REQUEST MAIL TIME OUT PROCESSING UNIT | REPLY WAITING TIME LIMIT OF ADVERTISEMENT INSERTION CONFIRMATION MAIL (ID = 2) |
| 3 | 11:14 | ADVERTISEMENT INSERTION END PROCESSING UNIT | ADVERTISEMENT INSERTION END TIME OF CONFERENCE HALL (ID = 1) |
| 4 | 12:33 | ADVERTISEMENT INSERTION END PROCESSING UNIT | ADVERTISEMENT INSERTION END TIME OF CONFERENCE HALL (ID = 5) |
| ⋮ | ⋮ | ⋮ | ⋮ |

*FIG.18*

[CONFERENCE HALL OF INTEREST ID] 3

CONFERENCE IS ACTIVE!!
<INFORMATION WITHIN LAST 5 MINUTES>
NUMBER OF PRESENTED MESSAGES: ○○
NUMBER OF PARTICIPANTS: ○○ (MALE: ○, FEMALE: ○)
FREQUENTLY APPEARING WORDS IN CONFERENCE: ○○

*FIG.19*

[KEYWORD OF INTEREST] Java
[CONFERENCE HALL ID] 4
CONFERENCE IS ACTIVE!!
<INFORMATION WITHIN LAST 5 MINUTES>
NUMBER OF PRESENTED MESSAGES: ○○
NUMBER OF PARTICIPANTS: ○○ (MALE: ○, FEMALE: ○)
FREQUENTLY APPEARING WORDS IN CONFERENCE: ○○

*FIG.21*

[CONFERENCE HALL ID] 2

CONFERENCE IS ACTIVE!!
<INFORMATION WITHIN LAST 5 MINUTES>
NUMBER OF MESSAGES PRESENTED: ○○
NUMBER OF PARTICIPANTS: ○○ (MALE: ○, FEMALE: ○)
FREQUENTLY APPEARING WORDS IN CONFERENCE: ○○

INSERT ADVERTISEMENT? <<CLICK!!>>
CURRENT ADVERTISING FEE: ○○ YEN/MINUTE

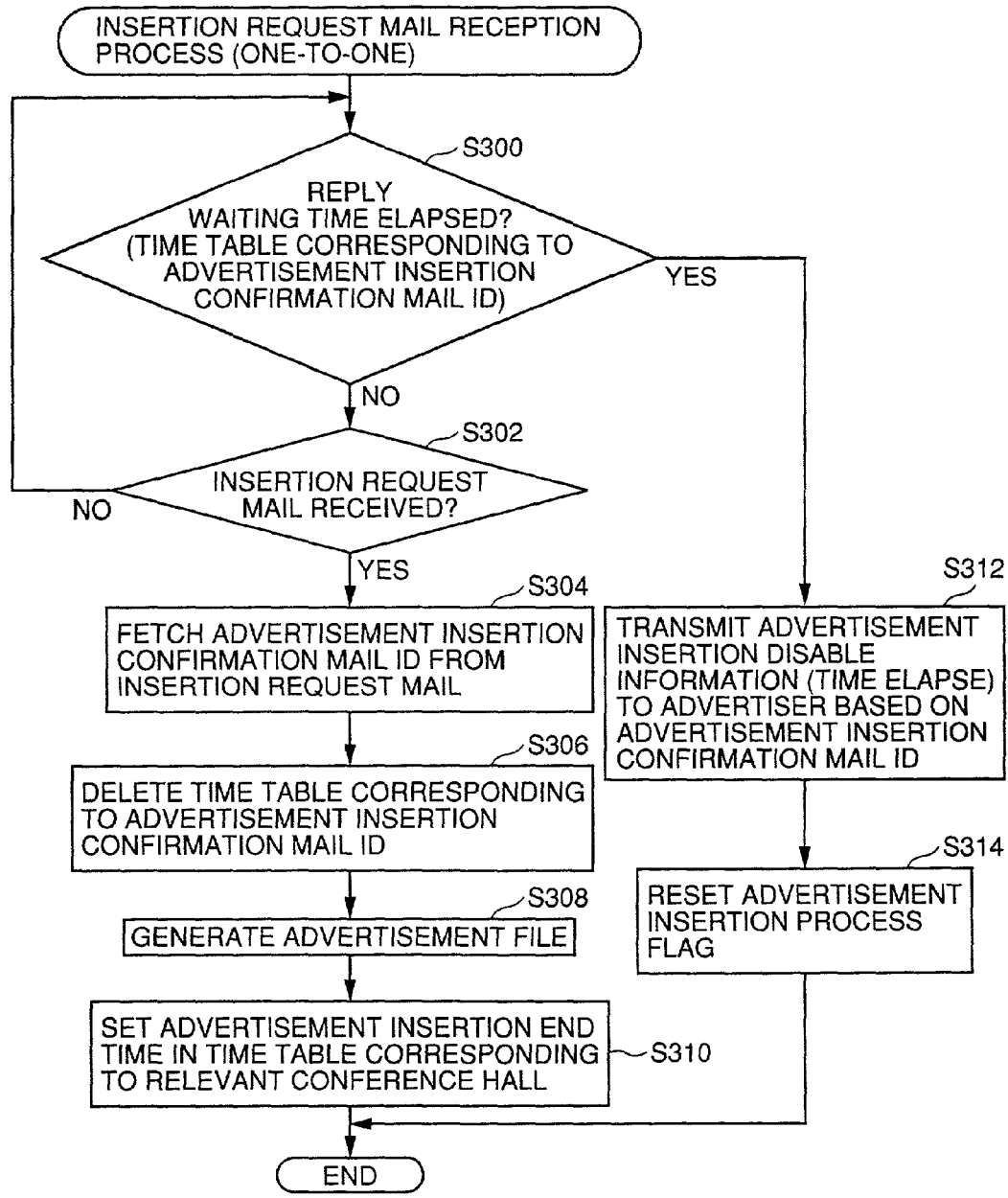

FIG.28

| ADVERTISEMENT INSERTION CONFIRMATION MAIL ID | CONFERENCE HALL ID | ADVERTISER ID | CANDIDATE ORDER | ADVERTISEMENT TEXT IDENTIFICATION INFORMATION |
|---|---|---|---|---|
| 1001 | 3 | 2 | 1 | SECOND ADVERTISEMENT TEXT |
| 1001 | 3 | 1 | 2 | NEW TRANSMITTED TEXT |
| 1001 | 3 | 3 | 3 | FIRST ADVERTISEMENT TEXT |
| ... | ... | ... | ... | ... |

FIG.31

| ADVERTISEMENT INSERTION CONFIRMATION MAIL ID | CONFERENCE HALL ID | ADVERTISER ID | ADVERTISING FEE (ONE MINUTE) | ADVERTISEMENT TEXT IDENTIFICATION INFORMATION |
|---|---|---|---|---|
| 2001 | 4 | 21 | X1 | SECOND ADVERTISEMENT TEXT |
| 2001 | 4 | 14 | X2 | NEW TRANSMITTED TEXT |
| 2001 | 4 | 3 | X3 | FIRST ADVERTISEMENT TEXT |
| ... | ... | ... | ... | ... |

APPARATUS AND METHOD SUPPORTING OPERATION OF SERVER BASED ON ACCESS STATUS TO SERVER AND COMPUTER-READABLE RECORDING MEDIUM RECORDED WITH PROGRAM REALIZING SUCH METHOD

BACKGROUND OF THE INVENTION

1. Field of the Invention

The present invention relates to a server connected to a plurality of client computers through a network, particularly to an apparatus supporting a server that operates an electronic conference system by storing opinions on the network in electronic data format and allowing users to browse the opinions.

2. Description of the Background Art

A system is known that stores information on a server connected to a network for allowing users to browse, e.g., electronic bulletin boards, electronic conference systems and chat rooms. In such a system, a count of browsing will be more and an activity of conferencing will more increase if much more information can be stored on the server by the users.

Japanese Patent Laying-Open No. 11-45279 discloses a system that measures the usage status of bulletin boards and the activity of conferencing in the systems of electronic bulletin boards and electronic conferencing. According to the electronic bulletin board system disclosed in this publication, correspondence transmitted from a user is posted on a designated bulletin board among a plurality of bulletin boards provided for respective predetermined subjects. This system includes a usage status measuring circuit checking the usage status of each bulletin board to determine an inactive bulletin board and an active bulletin board, a similar correspondence identify circuit to identify correspondence similar to the correspondence in an inactive bulletin board from the correspondence in an active bulletin board determined by the usage status measuring circuit, and a related correspondence display circuit to display information of an active bulletin board posted with the correspondence identified to be similar by the similar correspondence identify circuit at the inactive bulletin board identified to be similar.

The usage status measuring circuit checks the usage status of each bulletin board to determine an inactive bulletin board and an active bulletin board. The similar correspondence identify circuit identifies correspondence similar to the correspondence in an inactive bulletin board from the correspondence in the active bulletin board determined by the usage status measuring circuit. The related correspondence display circuit displays at the inactive bulletin board the information of the active bulletin board with the correspondence determined as to be similar determined by the similar correspondence identify circuit.

According to the disclosed system, the correspondence posted at the active bulletin board and that is similar to the correspondence posted at the inactive bulletin board is identified, and information of that active bulletin board is presented at the inactive bulletin board. Accordingly, an inactive bulletin board can be rendered active.

An apparatus that analyzes the contents of a bulletin board and conference in an electronic bulletin board and electronic conference system according to the interest of the user is disclosed in Japanese Patent Laying-Open No. 11-203326. The electronic conference support apparatus disclosed in this publication is connected to a network to allow conferencing for a plurality of users to store and browse electronic documents. The apparatus includes a classifying circuit classifying opinions in conferencing according to an attribute information of an opinion and a relation to another opinion, a conference management data generation circuit generating conference management data including the attribute information and electronic document representing an opinion in a conference, an extraction circuit that extracts an electronic document based on search terms for the conference management data, a management data generation circuit connected to the extraction circuit generating management data including the logic position information of the conference management data including the extracted electronic documents and the extracted electronic documents, and an output circuit providing the management data as a user's interest information.

The classifying circuit classifies the opinions in the conference based on attribute information of an opinion and the relation to another opinion. The conference management data generation circuit generates the conference management data including the attribute information and electronic document. The extraction circuit retrieves the electronic document according to the search terms for the conference management data. The management data generation circuit generates the management data including the logic position information of the conference management data including the extracted electronic documents and the extracted electronic documents. The output circuit provides the management data.

According to this apparatus, the user can retrieve an opinion according to his or her interest using a visual search result based on the logic position information.

However, the electronic bulletin board system disclosed in Japanese Patent Laying-Open No. 11-45279 only makes an inactive bulletin board active. The user cannot identify in real time the current usage status of the bulletin board.

The electronic conference support apparatus disclosed in Japanese Patent Laying-Open No. 11-203326 can only search for an opinion according to the user's interest based on the management data that are already under control of a management circuit. The user cannot identify in real time that conferencing of high interest to the user is currently made in the electronic conference system.

SUMMARY OF THE INVENTION

An object of the present invention is to provide a server operation support apparatus and server operation support method supporting the operation of a server that provides an electronic conference system or the like to which many client computers are connected through a network, based on the access status of a client computer to that server.

Another object of the present invention is to provide a server operation support apparatus and server operation support method supporting the operation of a server that provides an electronic conference system or the like, based on the contents transmitted from a client computer to that server.

A further object of the present invention is to provide a server operation support apparatus and server operation support method supporting the operation of a server that provides an electronic conference system or the like, based on the access site of that server.

Still another object of the present invention is to provide a server operation support apparatus and server operation support method supporting the operation of a server providing an electronic conference system or the like, based on information of a client computer that accesses that server.

A still further aspect of the present invention is to provide a server operation support apparatus and server operation support method supporting the operation of a server that provides an electronic conference system or the like to which many client computers are connected through a network, in response to a request from a client computer.

Yet a further object of the present invention is to provide a server operation support apparatus and server operation support method supporting the operation of a server that provides an electronic conference system or the like to which many client computers are connected through a network, by advertising efficiently to users using the client computers in that server.

According to an aspect of the present invention, a server operation support apparatus supports the operation of a server to which a plurality of client computers including a first client computer are connected through a network. The server operation support apparatus includes a communication circuit connected to the network to communicate information among the plurality of client computers to allow the plurality of client computers to share information with each other via the server, a storage circuit prestoring a transmission destination in transmitting information to the first client computer, a detection circuit connected to the network to detect the access status of a client computer to the server, and a control circuit connected to the communication circuit, the storage circuit, and the detection circuit to transmit information according to the access status to a transmission destination stored in the storage circuit when the access status detected by the detection circuit satisfies a predetermined condition.

The storage circuit prestores a transmission destination in order to transmit information to a first client computer. The detection circuit detects the access status of a client computer to the server. The control circuit transmits information based on the access status to a transmission destination stored in the storage circuit when the access status detected by the detection circuit satisfies a predetermined condition. The access status to the server is monitored in real time and notified to the first client computer when the access status satisfies the predetermined condition. The first client computer can be made aware of the access status to the server satisfying the predetermined condition to determine whether to access the server or not. In a server that provides an electronic conference system or the like to which many client computers are connected through a network, a server operation support apparatus supports the business management of the server by providing effectual information at an appropriate time to increase the number of access users.

Preferably, the server operation support apparatus further includes a registration circuit registering information of interest that is preset for a first client computer. The detection circuit includes a circuit detecting the information of interest registered in the registration circuit from the transmission data transmitted by a client computer to the server. The control circuit includes a circuit controlling the communication circuit so that, in response to the detection circuit detecting information of interest registered in the registration circuit from the transmitted data, information indicating that the transmission data including the information of interest of the first client computer has been transmitted to the server is transmitted to the first client computer having the detected information of interest.

The first client computer is notified when the transmission data including the registered information of interest is detected. The first client computer can be made aware of transmission of the transmission information including the information of interest to the server to determine whether to access the server or not.

Further preferably, the server includes a plurality of access sites to which the client computer accesses. The server operation support apparatus further includes a registration circuit to register an access site that is preset for first client computer. The detection circuit includes a circuit detecting the access status of a client computer to the server for access site. The control circuit includes a circuit controlling the communication circuit so that, in response to detection of access to an access site registered in the registration circuit by the detection circuit, information indicating the presence of a client computer accessing the access site set for the first client computer is transmitted to the first client computer.

The first client computer is notified when a client computer accesses the registered access site during the monitoring of the access status to the server in real time. The first client computer is made aware of the presence of a client computer accessing the access site of interest to determine whether to access the server or not.

Further preferably, the server operation support apparatus further includes a registration circuit registering the personal information preset for a user using the first client computer. The detection circuit includes a circuit detecting the personal information of the client computer that accesses the server. The control circuit includes a circuit controlling the communication circuit so that information indicating that a client computer having personal information similar to the personal information of the first client computer has accessed the server is transmitted to the first client having personal information similar to the personal information detected by the detection circuit.

The personal information of a client computer accessing the server is extracted. Notification of a client computer having personal information similar to the personal information of the first client computer has accessed the server is made to the first client computer having personal information similar to the extracted personal information. The first client computer is made aware of a user using a client computer having personal information (for example, sex, age, and the like) similar to his/her own personal information or arbitrary registered personal information to determine whether to access the server or not.

The server operation support apparatus of the present invention supports the operation of a server to which a plurality of client computers including a first client computer is connected through a network. The server operation support apparatus includes a communication circuit connected to the network to communicate information among a plurality of client computers to allow a plurality of client computers to share information with each other through the server. The communication circuit includes a circuit receiving query request information to inquire the access status from the first client computer. The server operation support apparatus further includes a detection circuit connected to the network to detect an access status of a client computer to the server, and a control circuit connected to the communication circuit and the detection circuit to control the communication circuit so that, in response to reception of the query request information by the communication circuit, information based on the access status is transmitted to the first client computer that has transmitted the query request information.

The detection circuit detects the access status of a client computer to the server. The communication circuit receives query request information to inquire the access status from the first client computer. The control circuit responds to the query request information from the first client computer to transmit information based on the access status to the first client computer that has transmitted the query request information. Upon receiving query request information to inquire the access status from the first client computer during monitoring of the access status to the server in real time, the first client computer is notified of the access status. The first client computer can directly inquire the access status to detect the access status to the server and determine whether to access the server or not. In a server that operates an electronic conference system or the like to which many client computers are connected through a network, a server operation support apparatus can be provided effectual information to increase the number of access users.

The server operation support apparatus of the present invention supports the operation of a server to which a plurality of client computers are connected through a network. The server can advertise to a plurality of client computers. The server operation support apparatus includes a storage circuit prestoring information indicating an advertiser, a detection circuit connected to the network to detect the access status of a client computer to the server, and a designation circuit connected to the storage circuit and the detection circuit to designate insertion of an advertisement to the server based on information indicating an advertiser stored in the storage circuit when the access status detected by the detection circuit satisfies a predetermined condition.

The storage circuit prestores information indicating an advertiser. The detection circuit detects the access status of a client computer to the server. The designation circuit designates insertion of an advertisement for an advertiser to the server based on information indicating the advertisement and an advertiser stored in the storage circuit when the access status detected by the detection circuit satisfies a predetermined condition. The access status to the server is monitored in real time. When the access status satisfies the predetermined condition, an advertisement is inserted in the server based on information indicating the advertiser stored in the storage circuit. In a server that operates an electronic conference system or the like to which many client computers are connected through the network, a server operation support apparatus is provided that inserts an advertisement when appropriate (for example, when access is active) to cause many users using the client computers to view the advertisement.

According to a further aspect of the present invention, a server operation support method supports the operation of a server to which a plurality of client computers including a first client computer is connected through a network. The server transmits and receives information with respect to the plurality of client computers to allow the plurality of client computers to share information with each other through the server. The server operation support method includes the steps of preparing a transmission destination to transmit information to the first client computer, detecting the access status of a client computer to the server, and transmitting information based on the access status to the transmission destination prepared at the step of preparing a transmission destination when the access status detected at the step of detecting the access status satisfies a predetermined condition.

The access status to the server is monitored in real time. The first client computer is notified when the access status satisfies the predetermined condition. The first client computer can be made aware that the access status to the server has satisfied the predetermined condition to determine whether to access the server or not. In a server that operates an electronic conference system or the like to which many client computers are connected through the network, a server operation support method supporting the operation of the server can be provided by supplying information timely to access when appropriate to increase the number of access users.

According to still another aspect of the present invention, a computer-readable recording medium is recorded with a program that realizes a server operation support method supporting the operation of a server to which a plurality of client computers including a first client computer are connected through a network. The server transmits and receives information with respect to the plurality of client computers to allow the plurality of client computers to share information with each other through the server. The server operation support method includes the steps of preparing a transmission destination to transmit information to the first client computer, detecting the access status of a client computer to the server, and transmitting information according to the access status to the transmission destination prepared at the step of preparing a transmission destination when the access status detected at the step of detecting an access status satisfies the predetermined condition.

The access status to the server is monitored in real time. The first client computer is notified when the access status satisfies the predetermined condition. The first client computer can be made aware of the access status to the server satisfying the predetermined condition to determine whether to access the server or not. In a server that operates an electronic conference system or the like to which many client computers are connected through the network, a computer-readable recording medium is provided recorded with a program that realizes a server operation support method supporting the operation of the server by supplying information timely to access when appropriate to increase the number of access users.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 shows an example of user information stored in a user information storage unit.

FIGS. 4 and 5 show examples of information of interest to the user stored in the user interest information storage unit.

FIG. 7 shows an example of a message stored in a message storage unit.

FIG. 8 shows an example of a conference hall information generated by a conference monitor unit.

FIG. 9 shows an example of advertiser information stored in an advertisement information storage unit.

FIGS. 10 and 11 show examples of advertisement information stored in the advertisement information storage unit.

FIG. 12 shows classification of the advertising fee.

FIG. 13 shows an example of the time table of a timer unit.

FIGS. 18 and 19 shows examples of electronic mail transmitted to a general user.

FIG. 21 shows an example of electronic mail transmitted to an advertiser.

FIG. 22 is a flow chart of the control procedure of an insertion request mail reception process executed by an insertion request mail reception processing unit.

FIG. 23 shows an example of electronic mail transmitted by an advertiser to the server operation support apparatus.

FIG. 28 shows an example of a data table that stores advertisement candidate data based on insertion request mail.

FIG. 31 shows an example of a data table that stores advertisement candidate data based on insertion request mail.

DESCRIPTION OF THE PREFERRED EMBODIMENTS

Figure 1:
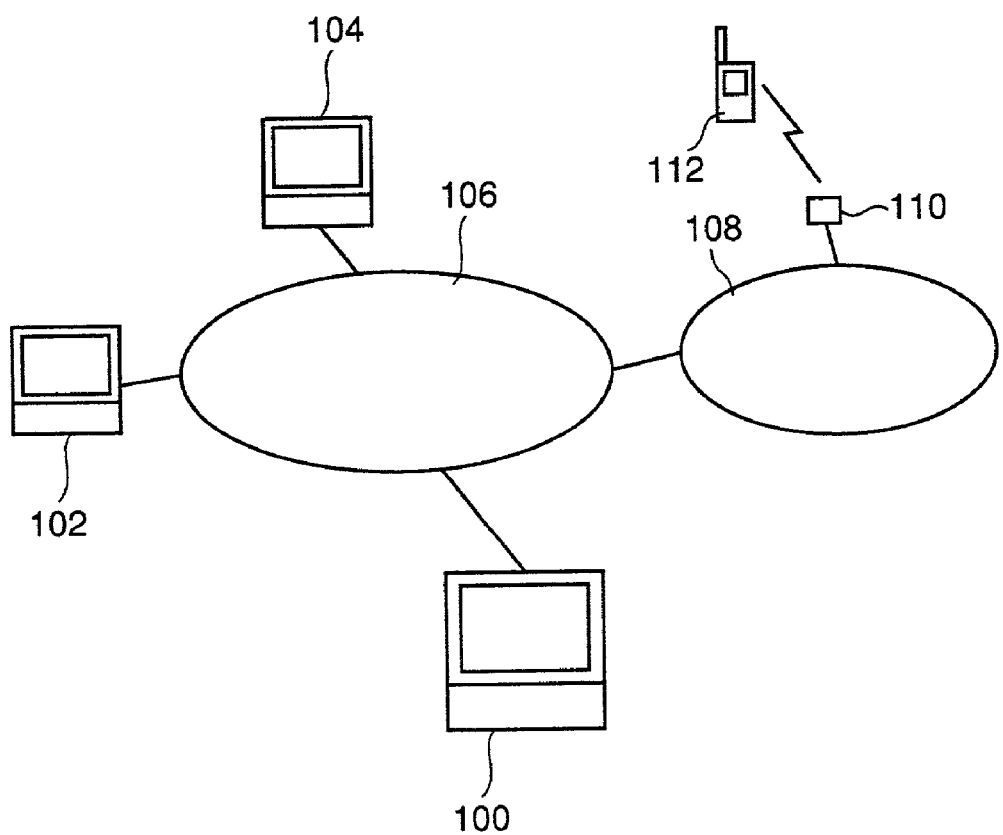
FIG. 1 shows the entire structure of an electronic conference system including a server operation support apparatus according to an embodiment of the present invention.

Embodiments of the present invention will be described hereinafter with reference to the drawings. In the description and drawings below, the same components have the same reference character allotted. Their label and function are the same. Therefore, detailed description thereof will not be repeated.

Referring to FIG. 1, the entire structure of an electronic conference system including a server operation support apparatus according to an embodiment of the present invention includes a server 100 realizing the server operation support apparatus of the present embodiment, a client personal computer 102 of a general user to present an opinion to the electronic conference system in electronic data format, a client personal computer 104 of an advertiser to insert an advertisement at a virtual conference hall (virtual conference hall referred to as "conference hall" hereinafter) realized by the electronic conference system, a first network 106 connecting server 100 with client personal computers 102 and 104, a second network 108 connected to first network 106, a cellular phone base station 110 connected to second network 108, and a cellular phone 112 receiving information from cellular phone base station 110 and displaying the received information at a display.

In the description below, it is assumed that the server operation support apparatus of the present embodiment is realized in a server that operates an electronic conference system. It will be understood that such description is merely exemplary and the server operating the electronic conference system and the apparatus realizing the server operation support apparatus may be provided separately.

Figure 2:
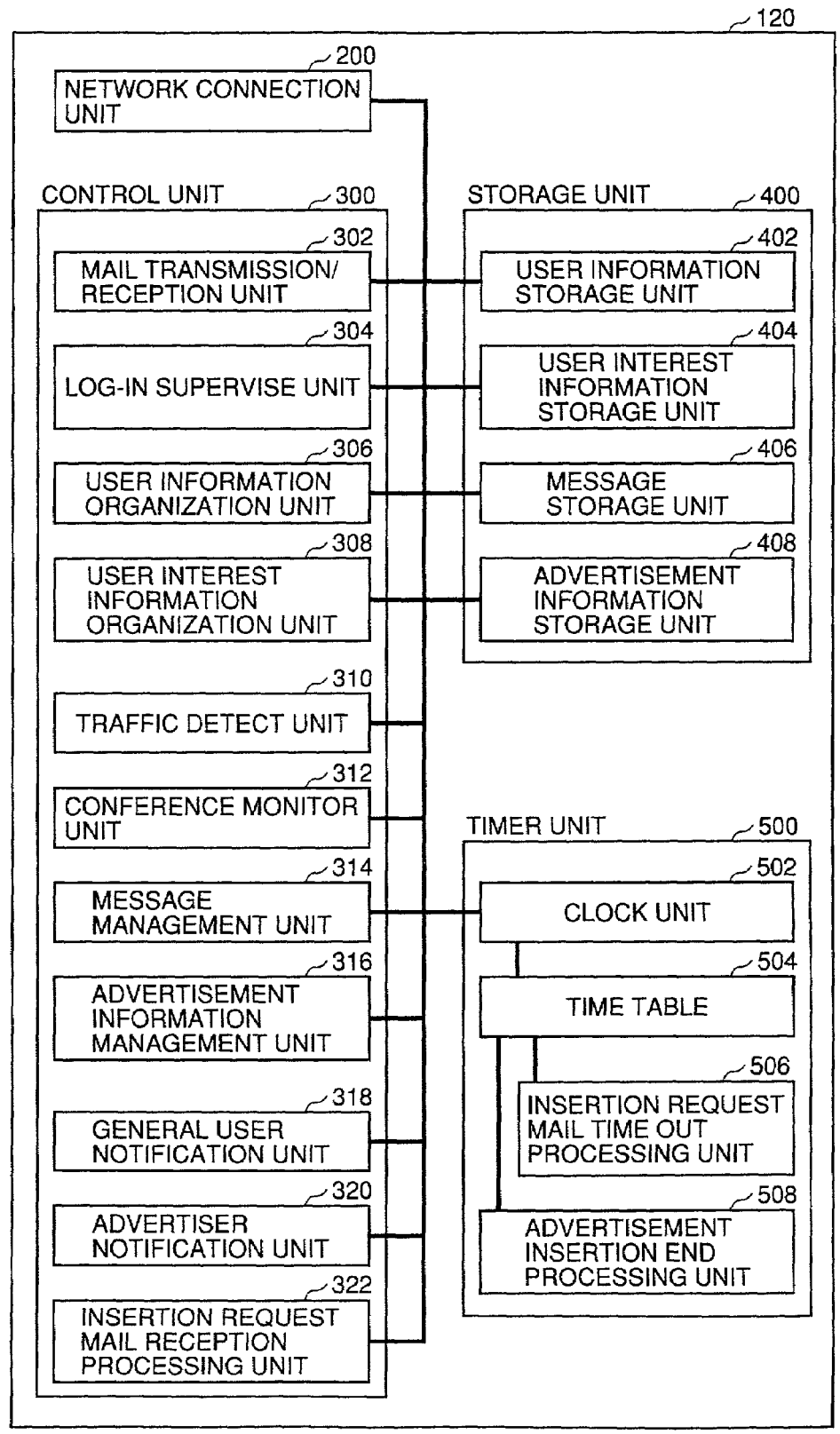
FIG. 2 is a control block diagram of a server operation support apparatus according to the embodiment of the present invention.

Referring to FIG. 2, a server operation support apparatus 120 according to the present embodiment in server 100 includes a network connection unit 200 connected to first network 106, which is an interface to provide communication with general user client personal computer 102, advertiser client personal computer 104 and cellular phone 112, a control unit 300 controlling each component of server operation support apparatus 120, a storage unit 400 storing various data, and a timer unit 500 sensing the current time to effect a predetermined designation at the set time.

Control unit 300 includes a mail transmission/reception unit 302 transmitting and receiving a mail according to the mail address of a general user stored in storage unit 400, a log-in supervise unit 304 supervising the log-in of a plurality of users selecting a conference hall to participate, based on user ID (identification) data and password data stored in storage unit 400, a user information organization unit 306 registering and modifying the user information stored in storage unit 400, and a user interest information organization unit 308 registering and modifying information of interest to the user stored in storage unit 400.

Control unit 300 further includes a traffic detect unit 310 detecting the access status per unit time from a general user client computer 104 to server 100 via first network 106, a conference monitor unit 312 monitoring the access status of a plurality of conference halls where a general user participates through general user client personal computer 102, a message management unit 314 organizing a message transmitted to a conference hall by a general user, and an advertisement information management unit 316 organizing the advertisement information inserted in the conference hall.

Control unit 300 further includes a general user notification unit 318 determining whether a predetermined condition is satisfied or not according to the access status information of a conference hall generated by conference monitor unit 312 to transmit predetermined information in electronic mail format to a general user when the predetermined condition is satisfied, an advertiser notification unit 320 transmitting advertisement insertion confirmation mail in electronic mail format to an advertiser when the predetermined condition is satisfied, and an insertion request mail reception processing unit 322 carrying out a reception process of insertion request mail from the advertiser who wishes to insert an advertisement.

Storage unit 400 includes a user information storage unit 402 storing general user ID data, password data, mail address data that are input through user information organization unit 306, and a user interest information storage unit 404 storing conference hall ID data indicating a conference hall of high interest to the user for each general user that is input through user interest information organization unit 308 or data indicating a keyword of interest to the user. Storage unit 400 further includes a message storage unit 406 storing a message transmitted from a general user via message management unit 314, and an advertisement information storage unit 408 storing advertisement information transmitted from an advertiser via advertisement information management unit 316. The information stored in user information storage unit 402 and user interest information storage unit 404 can be registered, altered, and deleted by the user through user information organization unit 306 and user interest information organization unit 308, respectively.

Timer unit 500 includes a clock unit 502 measuring the current time, a time table 504 connected to clock unit 502 and storing a time of execution for a plurality of processes, an insertion request mail time out processing unit 506 connected to time table 504 and carrying out a time out process of insertion request mail from an advertiser, and an advertisement insertion end processing unit 508 connected to time table 504 and carrying out an advertisement insertion end process when coming to the advertisement insertion time.

Referring to FIG. 3, the user information stored in user information storage unit 402 includes password data, mail address data, sex data and age data for each general user ID.

Referring to FIG. 4, the user interest information stored in user interest information storage unit 404 includes for each general user ID the data of a conference hall of interest ID, previous notification time, and the number of presented messages as well as the number of conference participants that is the condition to provide notification. For example, a general user with the user ID "sugi" is highly interested in the conference hall indicated as "conference hall ID=2". When the number of presented messages in this conference hall (conference hall ID=2) reaches the number of 15 or when the number of participants reaches the number of 10, "sugi" is notified of active conferencing in this conference hall (conference hall ID=2). This notification is effected through general user notification unit 318, and transmitted to mail address "sugi@foo.ne.jp" corresponding to the user ID "sugi" shown in FIG. 3.

Referring to FIG. 5, the user interest information stored in user interest information storage unit 404 includes data representing a keyword of interest, in addition to the information shown in FIG. 4 for each general user ID. In this case, the user interest information includes data representing a keyword of interest and the previous notification time for each general user ID.

Figure 6:
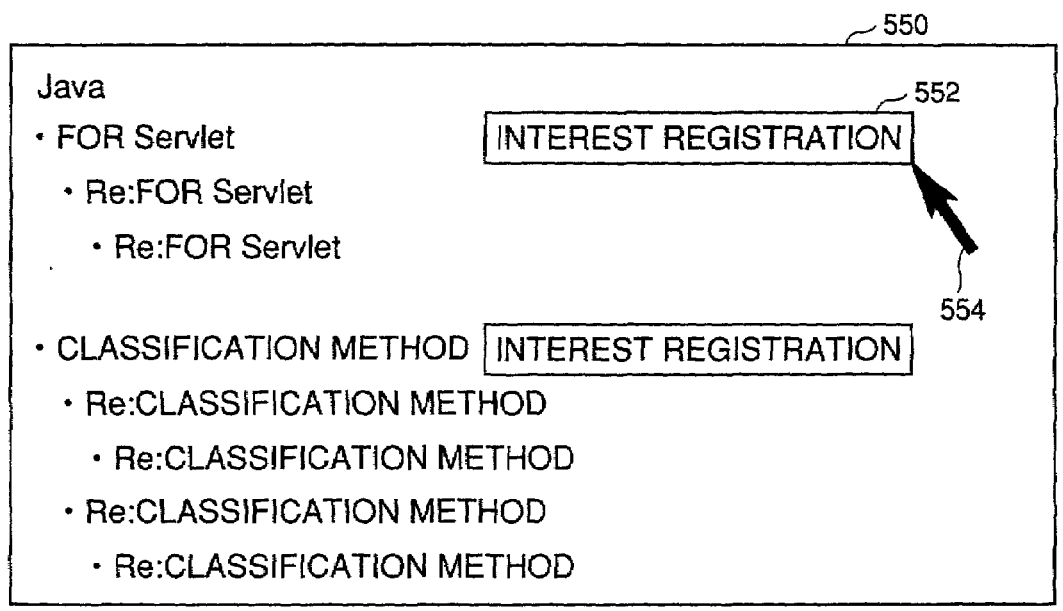
FIG. 6 shows an example of a screen displayed at a computer of a general user.

Registration of this keyword of interest is implemented through a screen 550 displayed on the monitor of general user client personal computer 102 as shown in FIG. 6. By pointing to an interest registration button 552 displayed on screen 550 with a mouse cursor 554 and clicking the mouse button, the keyword corresponding to interest registration button 552 is stored in interest information storage unit 404 as the keyword of interest. For example, by designating interest registration button 552 shown in FIG. 6 with mouse cursor 554 and clicking the mouse button, "Servlet" corresponding to interest registration button 552 is stored in interest information storage unit 404 as the keyword of interest.

Referring to FIG. 7, the message stored in message storage unit 406 through message management unit 314 includes the data of conference hall ID, title data, main text, presenter's name and the date of presenting correspondence for each general user ID. The title and main text data are stored in text format, and can be retrieved according to the keyword of interest of the user interest information shown in FIG. 5, stored in interest information storage unit 404.

Referring to FIG. 8, the access status information of a conference hall generated at conference monitor unit 312 (access status information of conference hall called "conference hall information" hereinafter) includes an advertisement insertion process flag and data indicating the current status for each conference hall ID. The advertisement insertion process flag is set for respective conference halls when a query is done so as to confirm about the advertisement insertion to an advertiser or when the advertisement in the conference hall is determined. The conference hall set with this flag is set so as to suppress any advertiser notification process that will be described afterwards. The data representing the current status stored in the conference hall information includes the data of the number of presented messages, the number of times a message is referred to and the number of participants in the conference. As to the data of the number of participants in the conference, the number is classified according to age and sex and then stored. As to a conference hall corresponding to conference hall ID=2, the advertisement insertion flag is reset. The number of presented messages over a predetermined time (for example, the last five minutes) is 11. The number of times the message is referred to is 21, and there are seven male participants and eight female participants in that conference.

Referring to FIG. 9, the advertiser information stored in advertisement information storage unit 408 includes password data and mail address data for each advertiser ID. The information shown in FIG. 9 can be registered, altered and deleted through advertisement information management unit 316.

Referring to FIG. 10, the advertisement information stored in advertisement information storage unit 408 includes for each advertiser ID the data of conference hall ID, advertising period, advertisement insertion condition, the URL (Uniform Resource Locators) of the homepage where advertisement information is stored, first advertisement text data, second advertisement text data, third advertisement text data, automation flag, and advertisement inserted duration data. As to the advertisement information shown in FIG. 10, only one advertiser is determined upon setting the conference hall and the advertising period. For example, as to the conference hall corresponding to conference hall ID=3, the advertiser with the advertiser ID=1 is determined during the period of time from Mar. 6, 2000 to Mar. 12, 2000, and the advertiser with the advertiser ID=2 is determined during the period of time from Mar. 13, 2000 to Mar. 19, 2000.

Referring to FIG. 11, the advertisement information stored in advertisement information storage unit 408 includes the advertisement information for a plurality of advertisers in addition to the advertisement information shown in FIG. 10. As shown in FIG. 11, the advertisement information has a plurality of advertisers registered in one conference hall without defining the advertising period. The advertisement information includes for each advertiser ID the data of conference hall ID, advertisement insertion condition, the URL of the homepage in which the advertisement data is stored, first advertisement text data, second advertisement text data, third advertisement text data and advertisement duration data. For example, as to the conference hall of conference hall ID=4, registration is made of the request to insert an advertisement by the advertiser with advertiser ID=6 under an advertisement insertion condition B and the advertiser with the advertiser ID=10 under the advertisement insertion condition A. As to the advertisers with the advertiser ID of 7, 8 and 9, request is made to insert an advertisement in all conference halls without defining a particular conference hall ID. In this case, registration is made of the request to insert an advertisement by advertisers with advertiser ID=7 and 9 under advertisement insertion condition A or B, and the advertiser with advertiser ID=8 under advertisement insertion condition B.

Referring to FIG. 12, the advertisement insertion condition is determined by the degree of activity that is calculated based on the access status for each conference hall. For example, advertisement insertion condition A is: the number of presented messages $\geq P1$ and the number of times a message is referred to $\geq Q1$ and the number of participants in conference $\geq R1$. Advisement insertion condition B is: the number of presented messages $\geq P2$ and the number of times a message is referred to $\geq Q2$ and the number of participants in conference $\geq R2$. Advertisement insertion condition C is: the number of presented messages $\geq P3$ and the number of times a message is referred to $\geq Q3$ and the number of participants in conference $\geq R3$. Here, it is assumed that the relationships of $P1>P2>P3$, $Q1>Q2>Q3$, $R1>R2>R3$ are established.

The advertising fee (per minute) is determined correspondingly to respective advertisement insertion conditions. For example, the advertising fee is X1, X2, and X3 for advertisement insertion conditions A, B, and C, respectively. Here, it is assumed that the relationship of $X1>X2>X3$ is established. In other words, the advertising fee of FIG. 12 is set to a higher value as the access status to the conference hall is more active.

Referring to FIG. 13, time table 504 includes for each time management ID the data of the time when a process specified by the time management ID is to be carried out, data representing the object that designates execution of a process, and data representing the contents of a set time. For example, when clock unit 502 senses the time of 10:05, insertion request mail time out processing unit 506 is notified that the reply time limit for the advertisement insertion confirm mail (advertisement insertion confirmation mail ID=1) has come (time management ID=1). In response to this notification, insertion request mail time out processing unit 506 carries out an insertion request mail time out process that will be described afterwards. When clock unit 502 senses the time of 11:14, advertisement insertion end processing unit 508 is notified that the advertisement insertion end time of the conference hall (conference hall ID=1) has come (time management ID=3). In response to this notification, advertisement insertion end processing unit 508 carries out an advertisement insertion end process that will be described afterwards.

Figure 14:
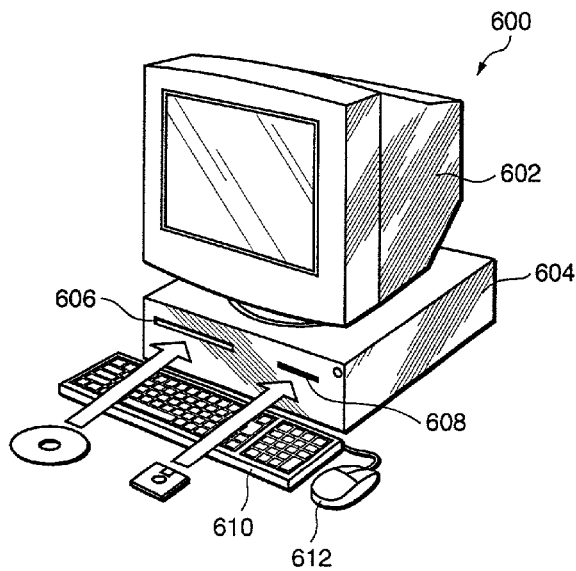
FIG. 14 shows an appearance of a computer that realizes a server operation support apparatus according to the embodiment of the present invention.

In practice, server operation support apparatus 120 is realized by software executed on a computer such as a personal computer or a work station. FIG. 14 shows an appearance of a computer system which is an example of a server operation support apparatus. Referring to FIG. 14, this computer system 600 includes a computer 602 with an FD (Flexible Disk) drive device 608 and a CD-ROM (Compact Disc-Read Only Memory) drive device 606, a monitor 604, a keyboard 610, and a mouse 612.

Figure 15:
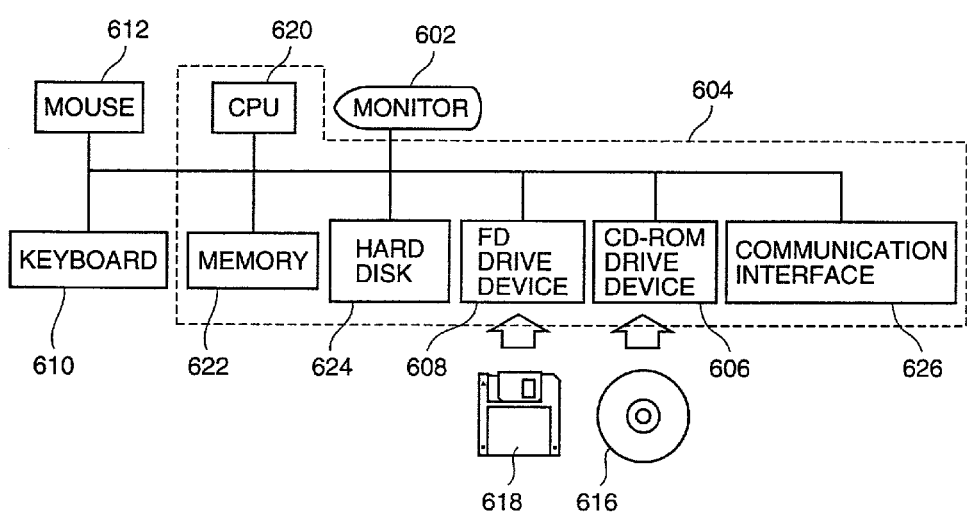
FIG. 15 is a control block diagram of the computer of FIG. 14.

FIG. 15 shows in block format the structure of computer system 600. Referring to FIG. 15, computer 602 includes, in addition to FD drive device 608 and CD-ROM drive device 606, a CPU (Central Processing Unit) 620, a memory 622, a hard disk 624 and a communication interface 626 all connected to each other through a bus. An FD 618 is loaded in FD drive device 608. A CD-ROM 616 is loaded in CD-ROM drive device 606.

Server operation support apparatus 120 is realized by a computer hardware and software executed by CPU 620. In general, this software is distributed stored in a recording medium such as FD 618, CD-ROM 616 and the like to be read out from the recording medium by FD drive device 608 or CD-ROM drive device 606 to be first stored in hard disk 624. The software is then read out from hard disk 624 into memory 622 to be executed by CPU 620. The hardware per se of the computer shown in FIGS. 14 and 15 is of the typical type. Therefore, the most essential portion of the present invention is the software recorded in a recording medium such as FD 618, CD-ROM 616, hard disk 624, and the like.

Network connection unit 200 shown in FIG. 2 corresponds to communication interface 626 shown in FIG. 15. Storage unit 400 shown in FIG. 2 corresponds to hard disk 624 show in FIG. 15. The function of control unit 300 and timer unit 500 of FIG. 2 is realized by the software executed by CPU 620 of FIG. 15.

As described above, the electronic conference system is realized by the hardware of computer system 600 and the software executed by CPU 620.

The operation of the computer per se shown in FIGS. 14 and 15 is well known. Therefore, detailed description thereof will not be repeated.

Figure 16:
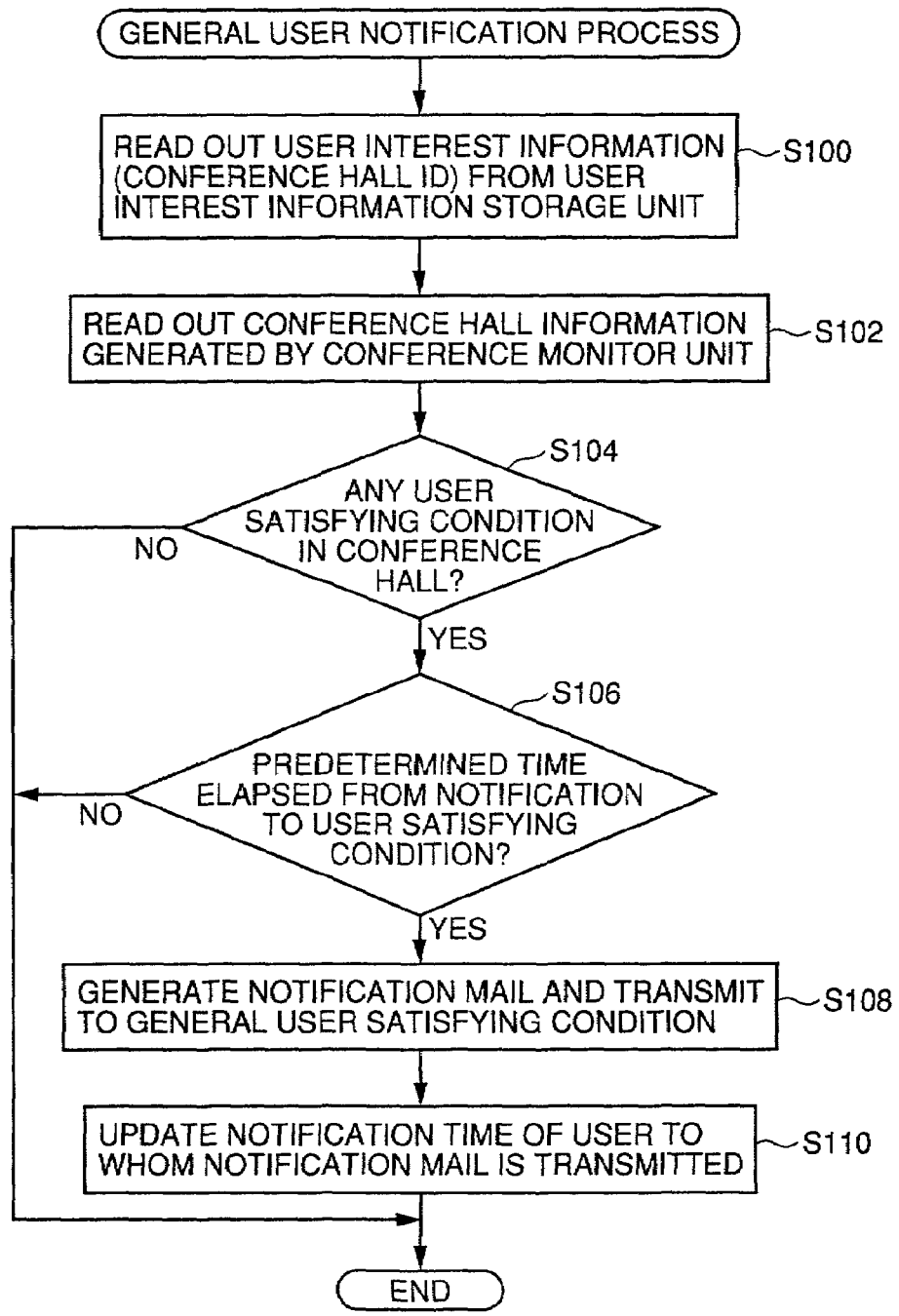
FIGS. 16 and 17 are flow charts of the control procedure of a general user notification process executed by a general user notification unit.

Referring to FIG. 16, the program executed by general user notification unit 318 of server operation support apparatus 120 of the present embodiment relates to a general user extraction process, having a control structure set forth in the following.

At step (abbreviated as S hereinafter) 100, CPU 620 reads out the user interest information (information indicating the information of interest to the user according to conference hall ID) stored in user interest information storage unit 404.

At S102, CPU 620 reads out the conference hall information (FIG. 8) generated by conference monitor unit 312.

At S104, CPU 620 determines whether there is any that satisfies the condition in the conference hall based on the conference hall information read out at S102. This determination is based on whether the current status of a conference hall specified by the conference hall ID read out at S100 satisfies a predetermined condition, for example, that the number of presented messages and the number of times the message is referred to that are registered for each user, for all the conference halls. When there is any that satisfies the condition determined by the number of presented messages and the number of times the message is referred to based on the current status of the conference hall information read out at S102 (YES at S104), control proceeds to S106. If there is none (NO at S104), the process ends.

At S106, CPU 620 determines whether a predetermined time has elapsed from the previous notification based on the notification time data of the user interest information (FIG. 4) for the user identified to satisfy the condition at S104 and the current time sensed by clock unit 502. If the predetermined time has elapsed from the notification to the user that satisfies the condition(YES at S106), the process proceeds to S108. If the predetermined time has not yet elapsed from the previous notification even if there is a user that satisfies the condition(NO at S106), the process ends. Accordingly, a user, even if satisfying the condition, does not have to receive frequently the notification.

At S108, CPU 620 generates a notification mail indicating that conference has becomes active in the conference hall of high interest to the user registered in advance by the user and transmits the generated mail to the general user that satisfies the condition. This communication is transmitted through mail transmission/reception unit 302 and network connection unit 200 to general user client personal computer 102 and cellular phone 112. General user client personal computer 102 and cellular phone 112 receives in electronic mail format the notification of active conferencing at the conference hall of high interest to the user, as shown in FIG. 18.

At S110, CPU 620 updates the data of the notification time of the general user to which the electronic mail was transmitted at S108.

Figure 17:
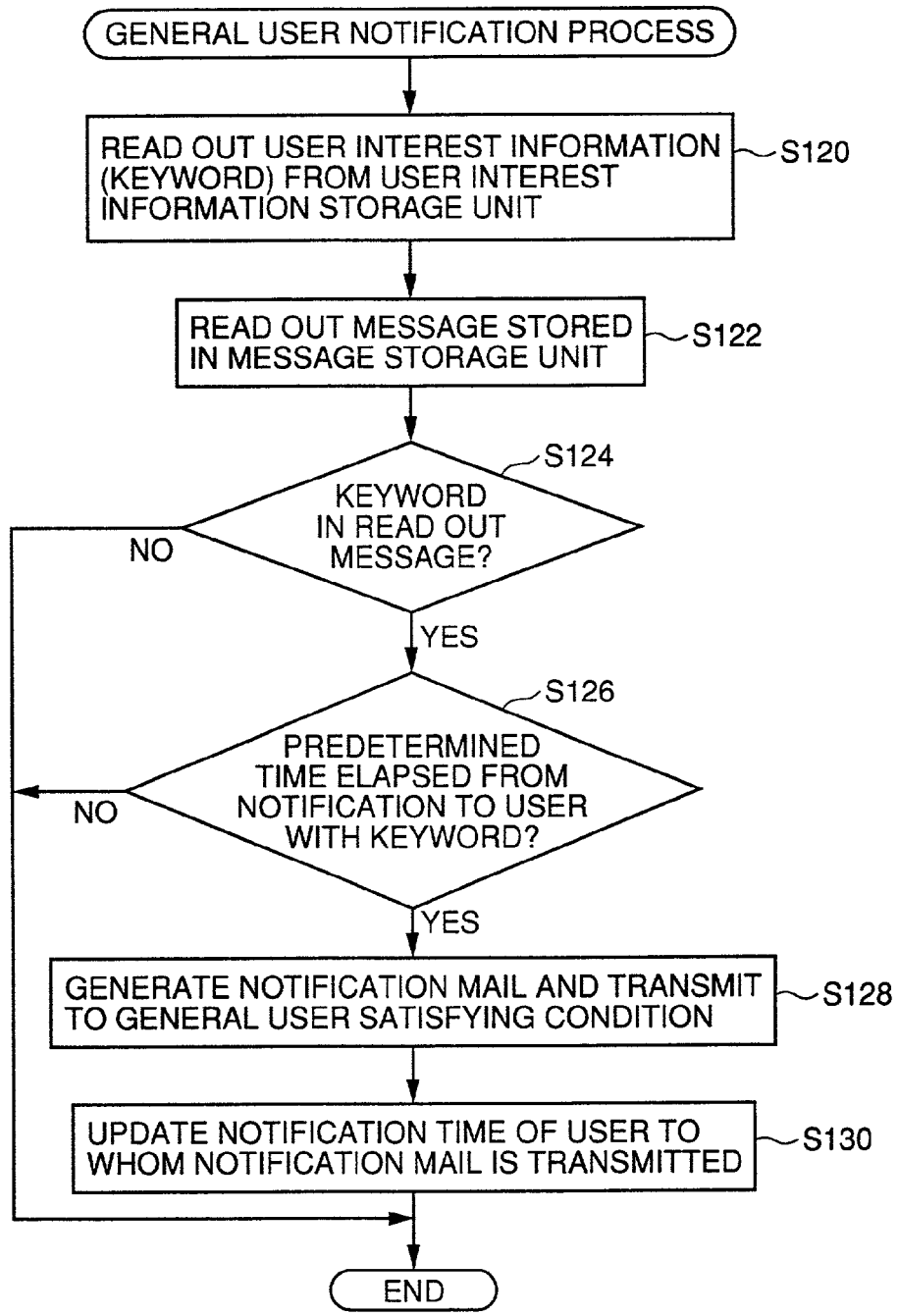

Referring to FIG. 17, the program executed by general user notification unit 318 of server operation support apparatus 120 of the present embodiment relates to a general user notification process, and has a control structure set forth in the following. It is to be noted that the general user notification process of FIG. 17 differs from the general user notification process of FIG. 16 in the format of the read out user interest information. In the process shown in FIG. 17, processes similar to those of FIG. 16 have the same reference character allotted. Therefore, detailed description thereof will not be repeated.

At S120, CPU 620 reads out user interest information stored in the format of keywords from user interest information storage unit 404 (FIG. 5).

At S122, CPU 620 reads out the title data and main text data of the message stored in message storage unit 406.

At S124, CPU 620 determines whether a keyword read out at S120 is present in the message read out at S122. This determination is carried out by searching for the keyword read out at S120 from the message read out at S122. In this case, not only the message main text, but also the title, becomes the subject of search. When the keyword is found in the read out message (YES at S124), the process proceeds to S126. When the keyword is not found in the read out message (NO at S124), the process ends.

At S126, CPU 620 determines whether a predetermined time has elapsed from the previous notification towards the user associated with the keyword searched for at S124, similar to the above-described process of S106. When a predetermined time has elapsed from the previous notification to the user that has the keyword searched for (YES at S126), the process proceeds to S128. If a predetermined time has not elapsed from the previous notification to the user that has the keyword searched for (NO at S126), the process ends. Accordingly, the user satisfying the condition is liberated from receiving frequently a notification, similar to the previous process of S106.

At S128, CPU 620 generates in electronic mail format a notification indicating the presence of a message including the keyword that is preregistered by the general user, and sends the generated notification to the general user via mail transmission/reception unit 302. General user client personal computer 102 and general user cellular phone 112 receives electronic mail indicating the emergence of a keyword of high interest to the user, as shown in FIG. 19. The information displayed through the electronic mail shown in FIG. 19 includes the number of presented messages at the conference, the number of times the message is referred to, and the number of participants in the conference hall of which the keyword emerges. These data are read out from the conference hall information generated by conference monitor unit 312.

At S130, CPU 620 updates the data of the notification time to the user who has received the notification mail at S128.

Figure 20:
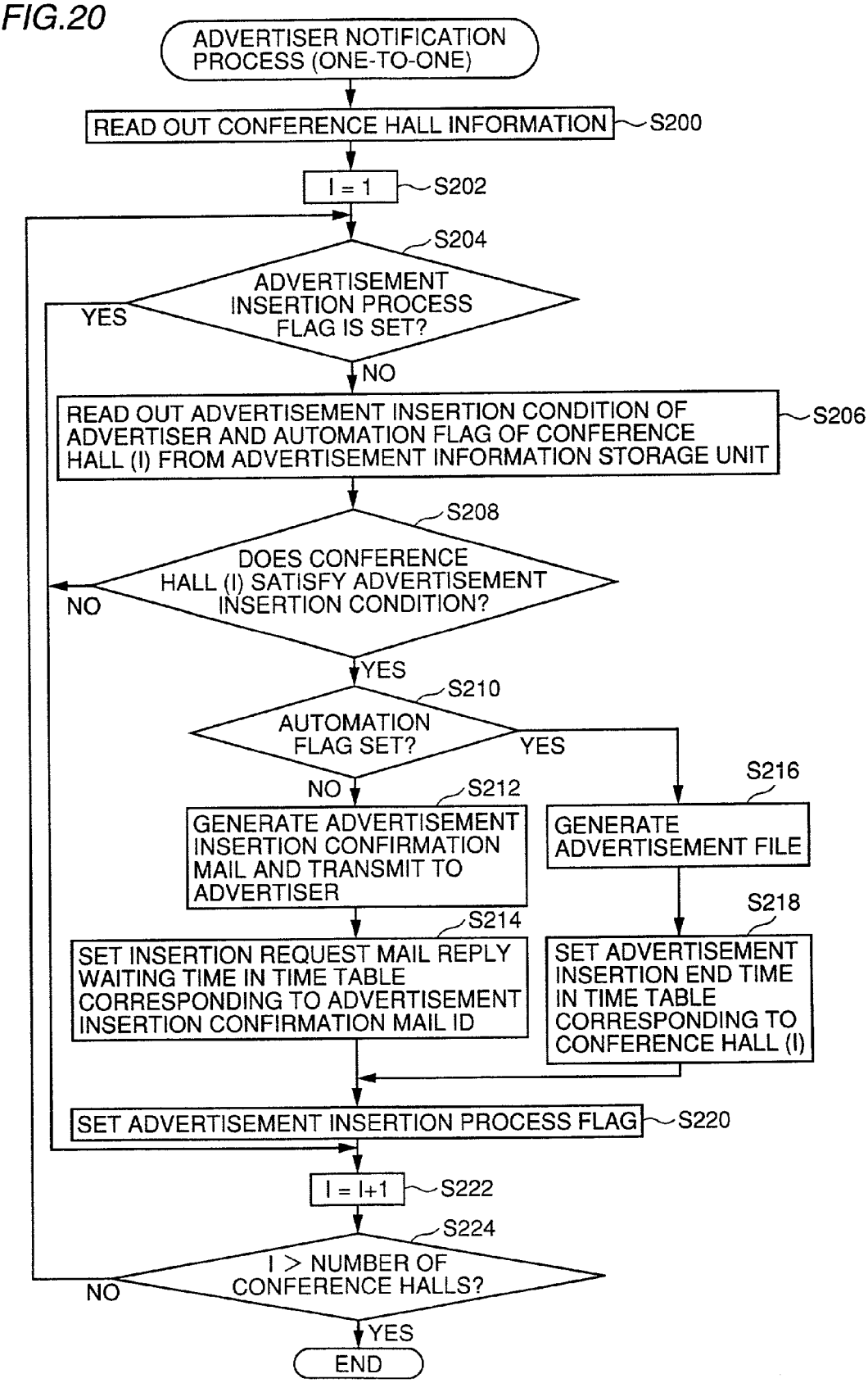
FIG. 20 is a flow chart of the control procedure of an advertiser notification process executed by an advertiser notification unit.

Referring to FIG. 20, the program executed by advertiser notification unit 320 of server operation support apparatus 120 of the present embodiment relates to an advertiser notification process (one-to-one correspondence), and has a control structure set forth in the following.

At S200, CPU 620 reads out the conference hall information generated by conference monitor unit 312. At S202, CPU 620 initializes a variable I (I=1).

At S204, CPU 620 determines whether the advertisement insertion process flag of conference hall (I) is set or not based on the conference hall information read out at S200. When the flag is set (YES at S204), the process proceeds to S224. When the flag is not set (NO at S204), the process proceeds to S206.

At S206, CPU 620 reads out the advertisement insertion condition of the advertiser and the automation flag of the conference hall (I) from advertisement information storage unit 408. In this case, the advertisement information read out from advertisement information storage unit 408 includes the advertisement information of an advertiser (FIG. 10) determined by the conference hall ID and the advertising period.

At S208, CPU 620 determines whether the advertisement insertion condition is satisfied or not according to the current status of the conference hall information read out at S200 for conference hall (I). This determination is based on the data as to the number of presented messages, the number of times the message is referred to and the number of participants in the conference, as well as the advertisement insertion condition shown in FIG. 10 and the access status for each advertisement insertion condition shown in FIG. 12. When determination is made that conference hall (I) satisfies the advertisement insertion condition (YES at S208), the process proceeds to S210. When determination is made that conference hall (I) does not satisfy the advertisement insertion condition (NO at S208), the process proceeds to S222.

At S210, CPU 620 determines whether the automation flag of the advertiser that satisfies the advertisement insertion condition is set or not, based on the advertisement information read out at S200. When the automation flag is set (YES at S210), the process proceeds to S216. When the automation flag is not set (NO at S210), the process proceeds to S212.

At S212, CPU 620 generates advertisement insertion confirmation mail and transmits the generated mail to the advertiser that satisfies the advertisement insertion condition. In this case, this advertisement insertion confirmation mail is transmitted to only one advertiser; therefore the determined advertiser is only one for each combination of the conference hall ID and the advertisement period.

Referring to FIG. 21, the advertisement insertion confirmation mail transmitted to the advertiser at S212 includes information indicating the conference hall ID that satisfies the advertisement insertion condition, as well as the number of presented messages and number of times the message is referred to, read out from the conference hall information. The advertisement insertion confirmation mail includes information indicating the advertising fee corresponding to the advertisement insertion condition of this advertiser.

At S214, CPU 620 sets the insertion request mail reply waiting time in the time table corresponding to the advertisement insertion confirmation mail ID. As will be described afterwards, when the insertion request mail corresponding to the advertisement insertion confirmation mail is not transmitted from the advertiser within this set insertion request mail reply waiting time, this advertiser cannot have the advertisement posted.

At S216, CPU 620 generates an advertisement file without transmitting the advertisement insertion confirmation mail since determination has been made that the automation flag is set at S210. This advertisement file is generated in the format that allows an advertisement to be posted in the conference hall. Generation of an advertisement file is carried out based on URL data, first advertisement text data, second advertisement text data and third advertisement text data, specified by the advertiser as shown in FIG. 10.

At S218, CPU 620 sets the advertisement insertion end time in the time table corresponding to conference hall (I). In this case, the advertisement insertion end time is set based on the advertisement insertion time data in the advertisement information of FIG. 10. Accordingly, the advertisement insertion end time of the advertisement file generated at S216 is set. The time table having the time set at S214 and S218 is time table 504 of timer unit 500 shown in FIG. 2.

At S220, CPU 620 sets the advertisement insertion process flag of conference hall (I). More specifically, the advertisement insertion process flag shown in FIG. 8 is set. This flag in a set state implies that advertisement insertion is being confirmed to an advertiser or an advertisement is currently posted, indicating that an advertiser does not have to be searched for.

At S222, CPU 620 adds 1 to variable I. At S224, CPU 620 determines whether variable I has exceeded the number of conference halls. When variable I has exceeded the number of conference halls (YES at S224), the process ends. When variable I has not yet exceeded the number of conference halls (NO at S224), the process proceeds to S204 to carry out the process for the next conference hall.

Referring to FIG. 22, the program executed by insertion request mail reception processing unit 322 of server operation support apparatus 120 of the present embodiment relates to an insertion request mail reception process (one-to-one correspondence), and has a control structure set forth in the following.

At S300, CPU 620 determines whether the reply waiting time has elapsed or not. This determination is based on the current time sensed by clock unit 502 and the time set in time table 504 corresponding to the advertisement insertion confirmation mail ID. When the reply waiting time has elapsed (YES at S300), the process proceeds to S312. When the reply waiting time has not yet elapsed (NO at S300), the process proceeds to S302.

At S302, CPU 620 determines whether insertion request mail has been received or not from the advertiser. This determination is made based on whether insertion request mail received via mail transmission/reception unit 302 is stored in the memory or not. When insertion request mail is received (YES at S302), the process proceeds to S304. When the insertion request mail is not received (NO at S302), the process returns to S300 to determine again whether the reply waiting time has elapsed or not. It is to be noted that any insertion request mail received after the expiration of the reply waiting time will be rendered invalid.

By the insertion request mail (received at S302) shown in FIG. 23, the conference hall ID and advertisement contents are transmitted to the designated address of the insertion request mail of server 100 that realizes server operation support apparatus 120.

Figure 24:
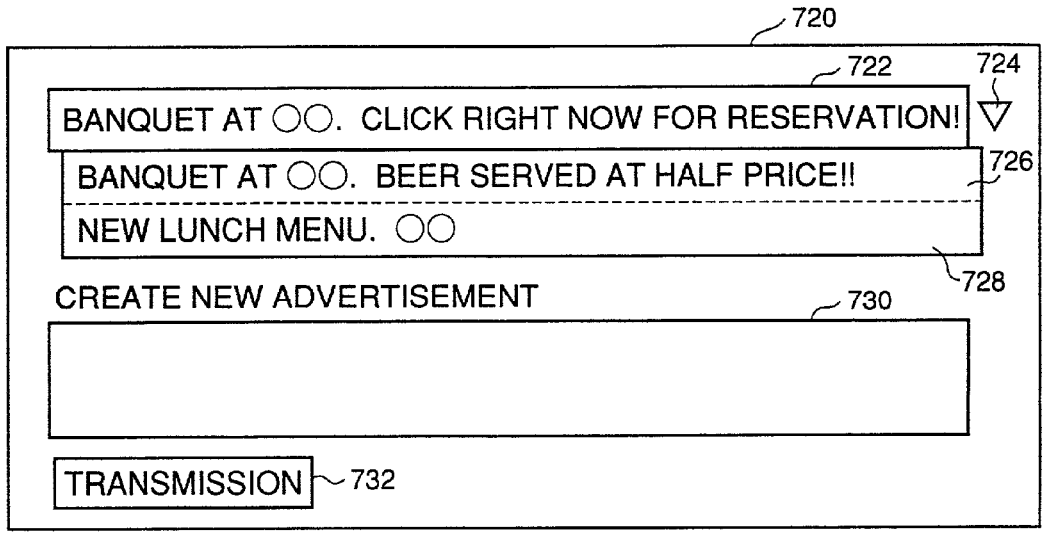
FIG. 24 shows an example of a display screen at an advertiser's computer.

In the case where the advertisement insertion request information is to be transmitted to server 100 realizing server operation support apparatus 120 through a browser, a screen 720 is provided on the monitor of advertiser client personal computer 104, as shown in FIG. 24. Screen 720 includes a first display region where the first advertisement text data registered in the advertisement information is displayed, a second display region 726 where the second advertisement text data is displayed, and a third display region 728 where the third advertisement text data is displayed. Screen 720 further includes a select button 724 to select one of these advertisement text, an input field 730 to create a new advertisement text, and a transmission button 732 to transmit data to server 100 after selecting an advertisement text or after creating a new advertisement text. The advertiser receiving the advertisement insertion confirmation mail connects his/her client personal computer 104 with server 100 to open screen 720. The advertiser selects an advertisement text or produces a new advertisement text and depresses transmission button 732, whereby insertion request mail is transmitted.

At S304, CPU 620 obtains the advertisement insertion confirmation mail ID from the insertion request mail received at S302. The insertion request mail includes the data of the advertisement insertion confirmation mail ID. At S306, CPU 620 erases the setting in time table 504 corresponding to the advertisement insertion confirmation mail ID.

At S308, CPU 620 generates an advertisement file according to the advertisement information (FIG. 10) stored in advertisement information storage unit 408. The process of producing this advertisement file is similar to the process of the previous S216. Therefore, detailed description will not be repeated.

At S310, CPU 620 sets the advertisement insertion end time in time table 504 corresponding to the relevant conference hall. In this case, the advertisement insertion end time is set based on the advertisement insertion time data of the advertisement information shown in FIG. 10. Accordingly, the advertisement insertion end time of the advertisement file generated at S308 is set. The time table set with the time at S310 is time table 504 of timer unit 500 of FIG. 2.

At S312, CPU 620 transmits the advertisement insertion disable information (time elapse) to the advertiser according to the advertisement insertion confirmation mail ID when determination is made that the reply waiting time has passed at S300. More specifically, for each conference hall, it is indicated that, although an advertisement insertion confirmation mail was transmitted to the advertiser satisfying the advertisement insertion condition, insertion request mail was not received from that advertiser within a predetermined time. In this case, it is assumed that the advertiser has no intention of placing an advertisement, and advertisement insertion disable information is transmitted at the elapse of the reply waiting time.

At S314, CPU 620 resets the advertisement insertion processing flag of the relevant conference hall.

Figure 25:
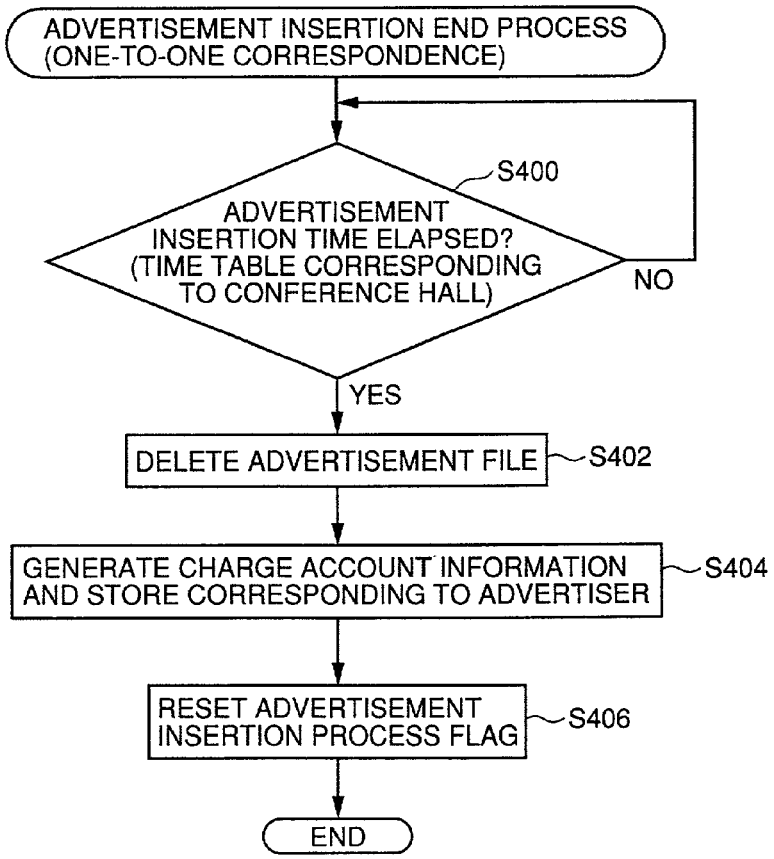
FIG. 25 is a flow chart of a control procedure of an advertisement insertion end process executed by an advertisement insertion end processing unit.

Referring to FIG. 25, the program executed by advertisement insertion end processing unit 508 of server operation support apparatus 120 of the present embodiment relates to the advertisement insertion end process (one-to-one correspondence), and has a control structure set forth in the following.

At S400, CPU 620 determines whether the advertisement insertion time has elapsed or not. This determination is based on the current time sensed by clock unit 502 and the time set in time table 504 corresponding to the conference hall. When the advertisement insertion time has elapsed (YES at S400), the process proceeds to S402. When the advertisement insertion time has not elapsed (NO at S400), the process returns to S400. Waiting is conducted for the elapse of the advertisement insertion time.

At S402, CPU 620 deletes the advertisement file. Accordingly, the advertisement is no longer posted at the relevant conference hall in the electronic conference system.

At S404, CPU 620 generates charge account information and stores the information in a memory corresponding to the advertiser. Generation of the charge account information is based on the advertisement duration data of FIG. 10 and the advertising fee of FIG. 12.

At S406, CPU 620 resets the advertisement insertion process flag of the relevant conference hall.

Figure 26:
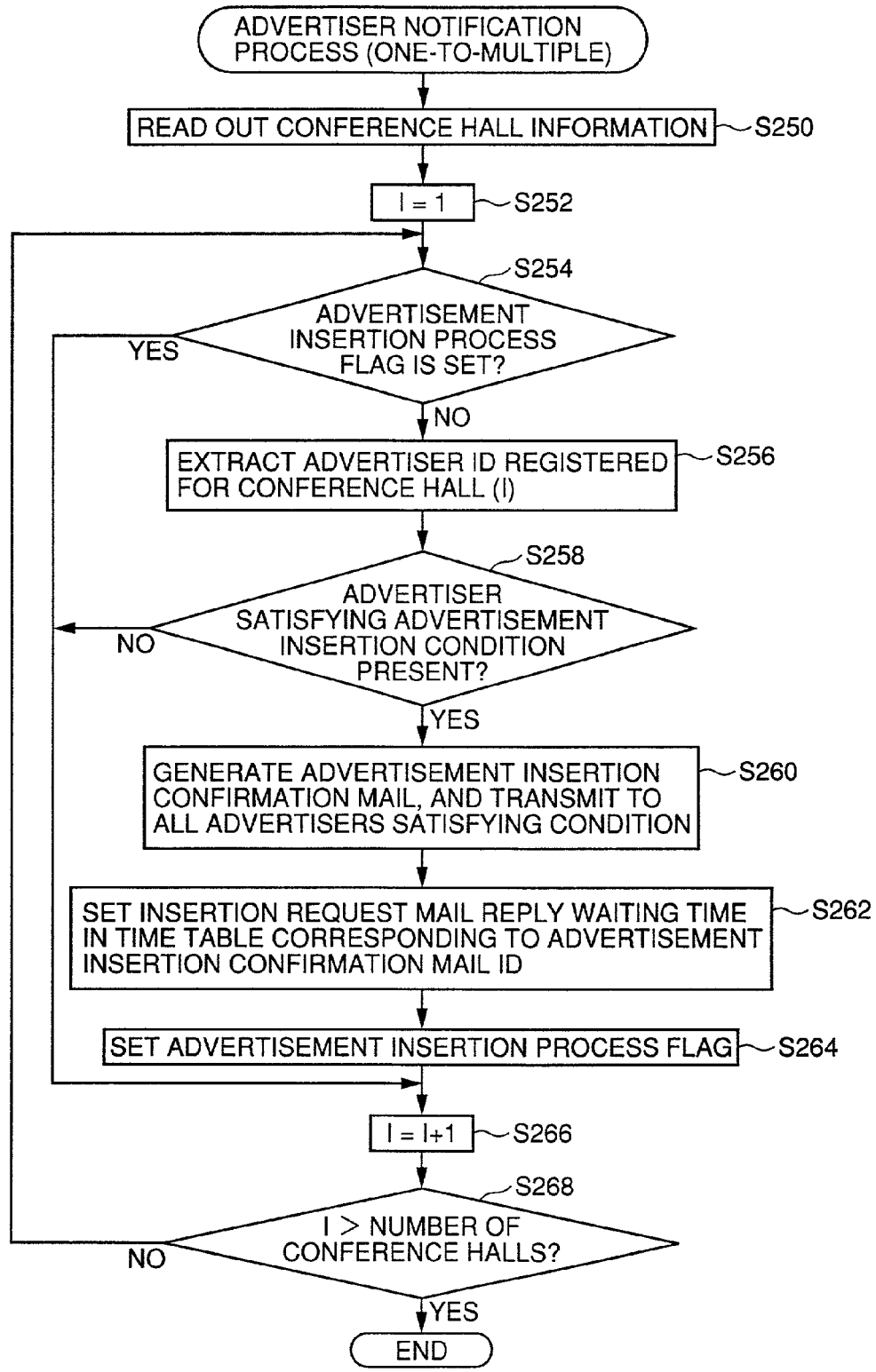
FIG. 26 is a flow chart of a control procedure of an advertiser notification process executed by an advertiser notification unit.

Referring to FIG. 26, the program executed by advertiser notification unit 320 of server operation support apparatus 120 of the present embodiment relates to an advertiser notification process (one-to-many), and has a control structure set forth in the following. In the process of FIG. 26, those steps similar to the steps of FIG. 20 have the same reference character allotted. Therefore, detailed description thereof will not be repeated.

At S250, CPU 620 reads out the conference hall information generated by conference monitor unit 312. At S252, CPU 620 initializes variable I (I=1).

At S254, CPU 620 determines whether the advertisement insertion process flag of conference hall (I) is set or not based on the conference hall information read out at S250. When the flag is locked (YES at S254), the process proceeds to S266. When the flag is not set (NO at S254), the process proceeds to S256.

At S256, CPU 620 extracts the advertiser ID of the advertiser that has registered an advertisement insertion request to conference hall (I). In this case, the advertiser who has registered insertion of an advertisement in conference hall (I) is extracted based on the advertisement information (FIG. 11) stored in advertisement information storage unit 408. For example, referring to FIG. 11, when I=5, advertisers corresponding to the conference hall of conference hall ID=5, advertisers. More specifically, the advertisers having the advertiser ID=7, 8, 9 and 11 are extracted Advertisers of advertiser ID=7, 8 and 9 are extracted for all conference halls since a particular conference hall ID is not registered.

At S258, CPU 620 determines whether an advertiser satisfying the advertisement insertion condition is present or not from the advertisers extracted at S256. This determination is based on the advertisement insertion condition shown in FIG. 11, the access status for each advertisement insertion condition of FIG. 12, and the current status of the conference hall information of FIG. 8 (number of presented messages, number of times the message is referred to, and the number of participants in conference). When determination is made that an advertiser satisfying the advertisement insertion condition is present (YES at S258), the process proceeds to S260. When determination is made that there is no advertiser that satisfies the advertisement insertion condition (NO at S258), the process proceeds to S266.

At S260, CPU 620 generates advertisement insertion confirmation mail and transmits the generated mail to all the advertisers satisfying the condition. The transmitted advertisement insertion confirmation mail is similar to the electronic mail shown in FIG. 21. The advertising fee is transmitted together with the mail. As to advertisers registering two or more conditions with respect to the advertisement insertion condition, the higher advertising fee is transmitted. Also, an advertisement insertion confirmation mail ID is added to the advertisement insertion confirmation mail. As to this advertisement insertion confirmation mail ID, one ID is allotted to each conference hall where an advertisement is posted when the advertisement insertion confirmation mail is transmitted to all the advertisers satisfying the advertisement insertion condition.

At S262, CPU 620 sets the insertion request mail reply waiting time in time table 504 corresponding to the advertisement insertion confirmation mail ID.

At S264, CPU 620 locks conference hall (I). At S266, CPU 620 adds 1 to variable I.

At S268, CPU 620 determines whether variable I has exceeded the number of conference halls. When variable I has exceeded the number of conference halls (YES at S268), the process ends. When variable I has not exceeded the number of conference halls (NO at S268), the process proceeds to S254. The process for the next conference hall is carried out.

Figure 27:
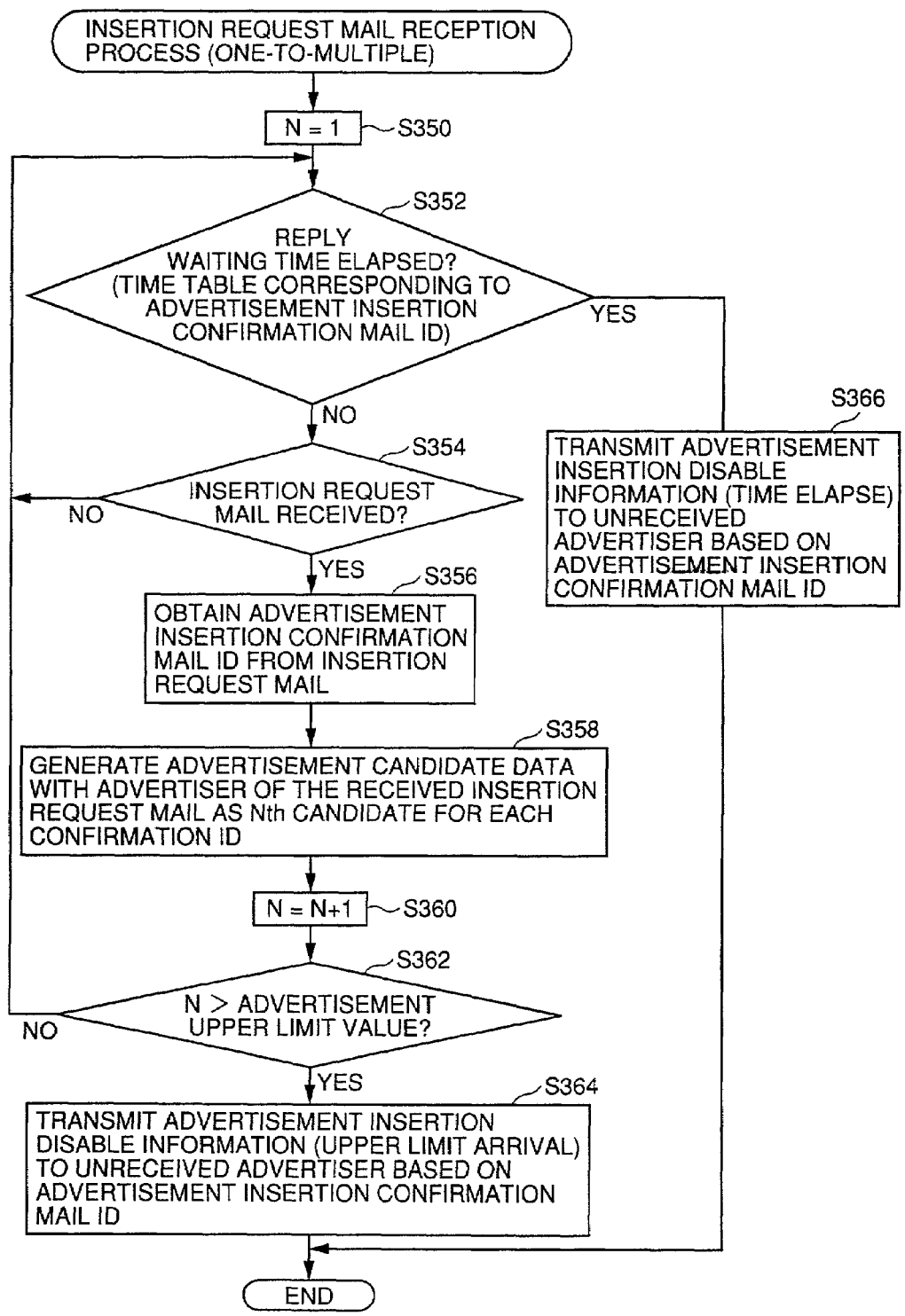
FIG. 27 is a flow chart of a control procedure of an insertion request mail reception process executed by an insertion request mail reception processing unit.

Referring to FIG. 27, the program executed by insertion request mail reception processing unit 322 of server operation support apparatus 120 of the present embodiment relates to an insertion request mail reception process (one-to-many), and has a control structure set forth in the following. In the process of FIG. 27, those steps similar to the steps of FIG. 22 have the same reference characters allotted. Therefore, detailed description thereof will not be repeated.

At S350, CPU 620 initializes the variable N (N=1).

At S352, CPU 620 determines whether the reply waiting time has elapsed or not. This determination is based on the current time sensed by clock unit 502 and the time set in time table 504 corresponding to advertisement insertion confirmation mail ID. When determination is made that the reply waiting time has elapsed (YES at S352), the process proceeds to S366. When determination is made that the reply waiting time has not elapsed (NO at S352), the process proceeds to S354.

At S354, CPU 620 determines whether the insertion request mail is received or not. When determination is made that insertion request mail is received (YES at S354), the process proceeds to S356. When determination is made that the insertion request mail is not received (NO at S354), the process proceeds to S352. Determination is made again whether the reply waiting time has elapsed or not. Any insertion request mail received after elapse of the reply waiting time is made invalid.

At S356, CPU 620 obtains the advertisement insertion confirmation mail ID from the insertion request mail received at S354.

At S358, CPU 620 generates advertisement candidate data setting the advertiser of the insertion request mail received at S354 as the Nth advertisement candidate and stores the generated data for each advertisement insertion confirmation mail ID.

Referring to FIG. 28, the advertisement candidate data generated at S358 includes data of conference hall ID, advertiser ID, candidate order and advertisement text identification information for each advertisement insertion confirmation mail ID. For example, when the advertisement insertion confirmation mail ID is 1001, the first advertisement candidate is the advertiser with the advertiser ID=2, and the second advertisement candidate is the advertiser with the advertiser ID=1. The advertiser with advertiser ID=2 requests insertion of the second advertisement text data whereas the advertiser with the advertiser ID=1 requests insertion of newly transmitted advertisement text data. Advertisement insertion confirmation mail ID is assigned to one conference hall (in the example of FIG. 28, ID=3) to specify a conference hall which is the object where the advertisement is to be posted. The advertisement identification information is included in the insertion request mail.

At S360, CPU 620 adds 1 to variable N. At S362, CPU 620 determines whether variable N has exceeded the advertisement upper limit value. This advertisement upper limit value defines the upper limit of the number of advertisements registered as predetermined advertisement candidates. When variable N exceeds the advertisement upper limit value (YES at S362), the process proceeds to S364. When variable N does not exceed the advertisement upper limit value (NO at S362), the process returns to S352 where determination is made again whether the reply waiting time has elapsed or not. More specifically, when determination is made again that the reply waiting time has not elapsed, determination is then made again whether insertion request mail has been received or not. When the insertion request mail is received again, the advertisement candidate data of the (N+1)th advertisement candidate is generated according to the insertion request mail received again. By repeating such a process, advertisement candidate data is generated until the reply waiting time has elapsed or until the registered number of advertisement candidates has exceeded the advertisement upper limit value. Advertisement candidate data is produced in which the order receiving the insertion request mail corresponds to the order of the advertisement candidate.

At S364, CPU 620 transmits the advertisement insertion disable information (arrival of upper limit) to the advertiser that has not received the insertion request mail based on the advertisement insertion confirmation mail ID, when determination is made that variable N has exceeded the advertisement upper limit value at S362.

At S366, CPU 620 transmits the advertisement insertion disable information (time elapse) to the advertiser that has not received the insertion request mail based on the advertisement insertion confirmation mail ID, when determination is made that the reply waiting time has elapsed at S352.

When the advertisement insertion confirmation mail is transmitted, the advertisement candidate data is stored in the generated advertisement candidate file for each advertisement insertion confirmation mail ID (i.e., for each conference hall ID where the advertisement is to be posted). Although advertisement candidate file is generated when advertisement insertion confirmation mail is transmitted, the generated advertisement candidate file will be empty when no insertion request mail has been received at the elapse of the reply waiting time.

Figure 29:
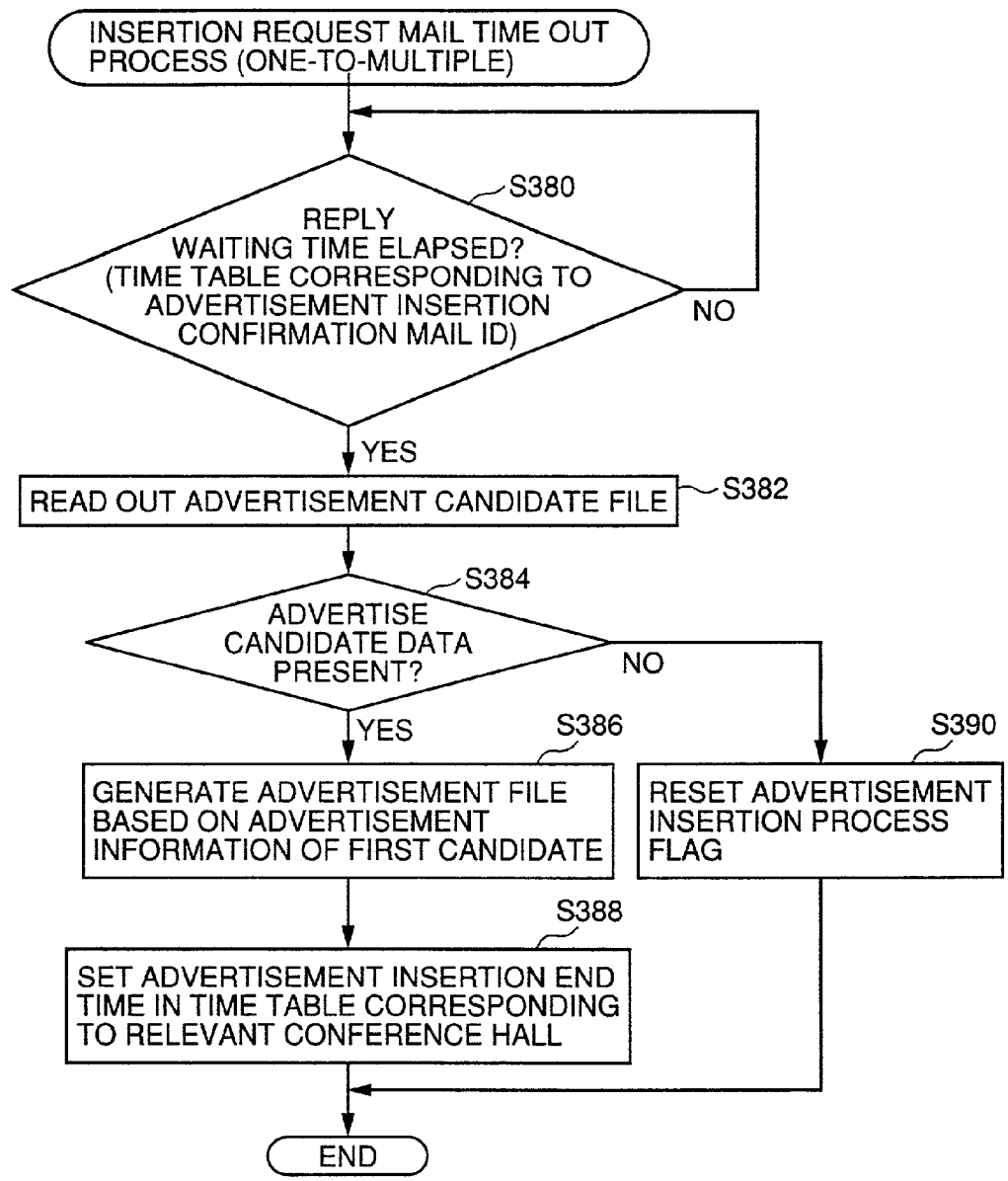
FIG. 29 is a flow chart of a control procedure of an insertion request mail time out process executed by an insertion request mail time out processing unit.

Referring to FIG. 29, the program executed at insertion request mail time out processing unit 506 of server operation support apparatus 120 of the present embodiment relates to an insertion request mail time out process (one-to-many), and has a control structure set forth in the following.

At S380, CPU 620 determines whether a reply waiting time has elapsed or not. This determination is based on the current time sensed by clock unit 502 and the time set in time table 504 corresponding to the advertisement insertion confirmation mail ID. When determination is made that the reply waiting time has elapsed (YES at S380), the process proceeds to S382. When determination is made that the reply wait time has not elapsed (NO at S380), the process returns to S380. Waiting is conducted for the elapse of the reply waiting time.

At S382, CPU 620 reads out the advertisement candidate file. Advertisement candidate data as shown in FIG. 28 or 29 is stored in this advertisement candidate file when insertion request mail is received before the reply wait time elapses.

At S384, CPU 620 determines whether there is advertisement candidate data in the advertisement candidate file read out at S382. When there is advertisement candidate data in the advertisement candidate file (YES at S384), the process proceeds to S386. When there is no advertisement candidate data in the advertisement candidate file (NO at S384), the process proceeds to S390.

At S386, CPU 620 generates an advertisement file based on the advertisement information of the first advertiser of the advertisement candidates of the advertisement candidate data. In this case, the advertisement file is generated based on the advertisement candidate data shown in FIG. 28 and the advertisement information shown in FIG. 11.

At S388, CPU 620 sets the advertisement insertion end time in time table 504 corresponding to the relevant conference hall. In this case, the advertisement insertion end time is set based on the advertisement insertion time data shown in FIG. 11. Accordingly, the advertisement insertion end time of the advertisement file generated at S386 is set.

At S390, CPU 620 resets the advertisement insertion process flag of the relevant conference hall when determination is made that there is no advertisement candidate data in the advertisement candidate file.

Figure 30:
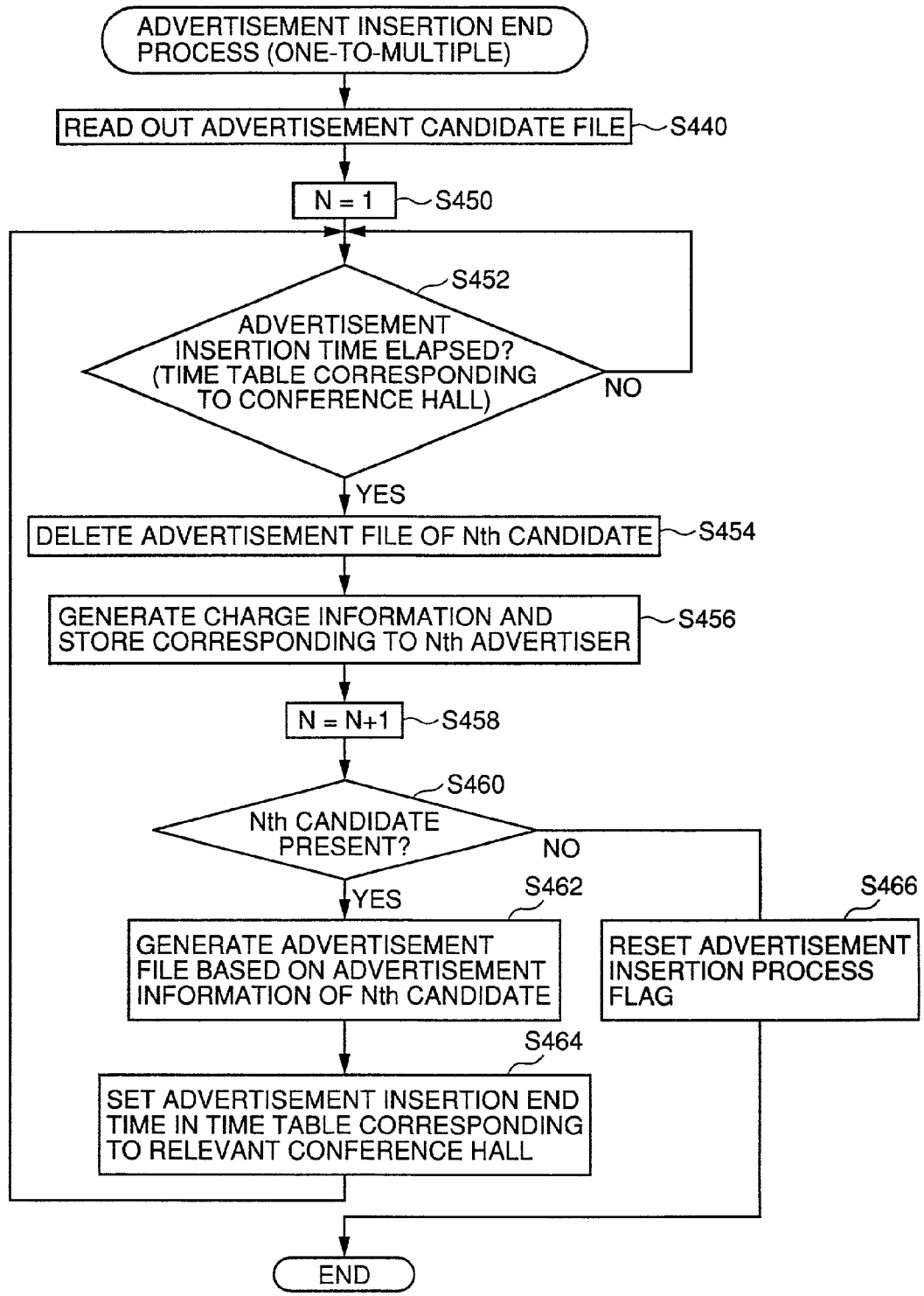
FIG. 30 is a flow chart of a control procedure of an advertisement insertion end process executed by an advertisement insertion end processing unit.

Referring to FIG. 30, the program executed by advertisement insertion end processing unit 508 of server operation support apparatus 120 of the present embodiment relates to an advertisement insertion end process (one-to-many), and has a control structure set forth in the following. In the flow chart of FIG. 30, those steps similar to those of FIG. 25 have the same reference character allotted. Therefore, detailed description thereof will not be repeated.

At S440, CPU 620 reads out the advertisement candidate file. The advertisement candidate data shown in FIG. 28 is stored in the advertisement candidate file when the insertion request mail is received before the reply waiting time elapses.

At S450, CPU 620 initializes variable N (N=1). At S452, CPU 620 determines whether the advertisement insertion time has elapsed or not. When the advertisement insertion time has elapsed (YES at S452), the process proceeds to S454. When the advertisement insertion time has not yet passed (NO at S452), the process proceeds to S452 to wait for the elapse of the advertisement insertion time.

At S454, CPU 620 deletes the advertisement file of the Nth advertisement candidate. At S456, CPU 620 generates charge account information and stores the generated information in the memory corresponding to the advertiser of the Nth candidate.

At S458, CPU 620 adds 1 to variable N. At S460, CPU 620 determines whether there is the Nth advertisement candidate according to the advertisement candidate file read out at S440. When the Nth advertisement candidate is present (YES at S460), the process proceeds to S462. When the Nth advertisement candidate is not present (NO at S460), the process proceeds to S466.

At S462, CPU 620 generates an advertisement file based on the advertisement information of the Nth candidate. At S464, CPU 620 sets the advertisement insertion end time in the time table corresponding to the relevant conference hall.

At S466, CPU 620 resets the advertisement insertion process flag of the relevant conference hall when determination is made that the Nth advertisement information is absent at S460. By such a process, an advertisement is posted for candidates up to the Nth candidate registered in the advertisement candidate data. In this case, the number of candidates N corresponds to the advertisement upper limit value when the advertisement upper limit value has been reached before the reply waiting time has elapsed, and corresponds to a number smaller than the advertisement upper limit value when the reply waiting time has elapsed before the advertisement upper limit value is exceeded.

The operation of server operation support apparatus 120 will be described hereinafter based on the above structure and flow charts.

[General User Notification Process]

The electronic conference system is logged in through general user client personal computer 102. When a conference hall of interest ID is to be registered, the conference hall ID of the conference hall of interest is input through the keyboard of general user client personal computer 102 together with the number of presented messages and the number of participants in the conference which are the conditions to receive notification. The input conference hall ID is registered in user interest information storage unit 404 as the conference hall ID of interest shown in FIG. 4. When a keyword of interest is to be registered, screen 550 of FIG. 6 is provided on the monitor of general user client personal computer 102. Interest registration button 552 on screen 550 is pointed to and clicked with mouse pointer 554. In response to this click, the keyword corresponding to the clicked interest registration button 552 is registered as the keyword of interest shown in FIG. 5 in user interest information storage unit 404.

Following this registration, determination is made whether a predetermined time has elapsed from the previous notification to the user that satisfies the condition when the condition shown in FIG. 4 is satisfied (YES at S104) in the plurality of conference halls during conferencing in the electronic conference system (S106). When a predetermined time has elapsed from the previous notification to the user that satisfies the condition (YES at S106), the notification mail of FIG. 18 is produced and transmitted to the user that satisfies the condition (S108). The general user receiving this notification mail is made aware of active conferencing in the conference hall of his/her own interest and may participate in that conference hall at his/her discretion.

When the keywords shown in FIG. 5 are registered, the message transmitted from the general user is stored in message storage unit 406 through network connection unit 200 and message management unit 314. At a predetermined time interval (for example, one minute), the message stored in message storage unit 406 is read out (S122), and determination is made whether the registered keyword is present in the read out message (S124). When there is the keyword in the read out message and a predetermined time has elapsed from the previous notification to the user that has registered that keyword (YES at S126), the notification mail as shown in FIG. 19 is produced and transmitted to the general user that satisfies the condition (S128). Similar to the general user receiving the notification mail shown in FIG. 18, the general user receiving the notification mail of FIG. 19 is made aware of the conference hall that transmits the message that has the keyword of his/her own interest and may participate in that conference hall at his/her discretion.

[Advertiser Process (One-to-One)]

The advertiser requesting to insert an advertisement to the electronic conference system operated by the server registers the advertisement information as shown in FIG. 10 or 11 via advertisement information management unit 316. At a predetermined time interval, the conference hall information is read out (S200). Determination is made whether the advertisement insertion condition is satisfied or not in a conference hall (S208). When the advertisement registration condition is satisfied and the automation flag is set, an advertisement file is generated without transmitting the advertisement insertion confirmation mail (S216). The advertisement insertion end time is set in the time table corresponding to that conference hall based on the advertisement information (S218).

When the advertisement registration condition is satisfied and the automation flag is not set (NO at S210), advertisement insertion confirmation mail shown in FIG. 21 is generated and transmitted to the advertiser (S212). When there is an advertiser satisfying the advertisement insertion condition in the conference hall, the advertisement insertion process flag of conference hall is set (S220).

The above-described process is carried out for all the conference halls hosted in the electronic conference system. When the advertisement insertion condition is satisfied and the automation flag set, the advertisement file is generated automatically. When the automation flag is not set, the advertisement insertion confirmation mail is transmitted to the advertiser.

Prior to the elapse of the reply waiting time (NO at S300) if the automation flag is not set, reception of insertion request mail (YES at S302) causes the advertisement insertion confirmation mail ID to be fetched from the insertion request mail (S304) and the setting in the time table corresponding to the advertisement insertion confirmation mail ID is erased (S306). Upon receiving insertion request mail from the advertiser, an advertisement file is produced (S308), and the advertisement insertion end time is set in the time table corresponding to that conference hall based on the advertisement information (S310).

When the reply waiting time has elapsed before reception of insertion request mail, advertisement insertion disable information (time elapse) is transmitted to the advertiser based on the advertisement insertion confirmation mail ID. Following transmission of the advertisement insertion disable information, the advertisement insertion process flag of the relevant conference hall is reset (S314).

When the advertisement insertion time has elapsed (YES at S400), the advertisement file is deleted (S402). Charge account information corresponding to the advertisement up to the elapse of the advertisement insertion time is generated and stored corresponding to the advertiser (S404). Then, the advertisement insertion process flag of relevant conference hall is reset (S406).

When the advertiser is determined as one by the advertising period and conference hall as shown in FIG. 10 and the automation flag is set, an advertisement file is produced automatically and the advertisement insertion end time is set. When the automation flag is not set and insertion request mail is received prior to the elapse of the reply waiting time from the transmission of the advertisement insertion confirmation mail, an advertisement file is generated and the advertisement insertion end time is set. The advertisement is posted at the conference hall based on the produced advertisement file until the elapse of the set advertisement insertion end time.

[Advertisement Process (One-to-Many)]

In case of a plurality of advertisers being registered with respect to one conference hall as shown in FIG. 11 in the advertisement information stored in advertisement information storage unit 408, an advertisement process is carried out as set forth below.

The conference hall information is read out at a predetermined time interval (S250). The advertiser ID registering an advertisement insertion request is extracted for the unlocked conference hall (S256). When there is an advertiser or advertisers satisfying the advertisement insertion condition in the extracted advertisers (YES at S258), advertisement insertion confirmation mail is generated and transmitted to all the advertisers satisfying the condition (S260). The insertion request mail reply waiting time is set in the time table corresponding to the ID of the advertisement insertion confirmation mail (S262). The advertisement insertion process flag of the relevant conference hall is locked (S264). Such a process is carried out for all conference halls.

Following the transmission of the advertisement insertion confirmation mail to all advertisers satisfying the advertisement insertion condition for respective conference halls, reception of insertion request mail (YES at S354) before elapse of the reply waiting time (NO at S352) causes the advertisement insertion confirmation mail ID to be fetched from the insertion request mail (S356). Advertisement candidate data with the advertiser receiving the insertion request mail as the Nth advertisement candidate is generated and stored for each advertisement insertion confirmation mail ID (S358). Advertisement candidate data is stored in the advertisement candidate file until the advertisement upper limit value is reached or until the reply waiting time elapses in the process of generating advertisement candidate data. When the reply waiting time has elapsed, advertisement insertion disable information (time elapse) is transmitted (S366) to the advertiser that has not received insertion request mail according to the advertisement insertion confirmation mail ID. When the advertisement upper limit value has been reached prior to the elapse of the reply waiting time, the advertisement insertion disable information (arrival of upper limit) is transmitted to the advertiser that has not received the advertisement request mail according to the advertisement insertion confirmation mail ID (S364).

At the elapse of the reply waiting time (YES at S380), the advertisement candidate file is read out (S382). When there is advertisement candidate data in the advertisement candidate file (YES at S384), an advertisement file is generated according to the advertisement information of the first candidate (S386). When there is no advertisement candidate data in the read out advertisement candidate file (NO at S384), the advertisement insertion process flag of the relevant conference hall is reset. This unlock causes extraction again of any advertiser satisfying the advertisement condition for this conference hall. Then, the advertisement insertion confirmation mail is transmitted again.

At the elapse of the advertisement insertion time (YES at S452) in the event that the advertisement is posted in the conference hall based on the advertisement file (YES at S452), the advertisement file of the advertisement that was posted is deleted (S454). Charge account information for the advertisement that was posted till then is stored in the memory corresponding to the relevant advertiser (S456). This process is carried out for all advertisement candidates. When this process is completed for all advertisement candidates (NO at S460), the advertisement insertion process flag of the relevant conference hall is reset (S466). By such a process, an advertisement can be posted in a conference hall according to the advertisement order for all the advertisement candidates registered in the advertisement candidate file.

In a server that operates an electronic conference system to which many users are connected through a network, the server operation support apparatus of the present embodiment transmits notification mail to a relevant general user when conferencing becomes active at a conference hall registered as of interest by that general user or when a keyword registered as of interest by that general user appears in conferencing. An advertiser wishing to insert an advertisement by electronic data in the electronic conference system registers in advance an advertisement insertion condition of a conference hall. The server operation support apparatus transmits advertisement insertion confirmation mail to the advertiser that satisfies the advertisement insertion condition. The server operation support apparatus generates an advertisement file upon receiving insertion request mail from the advertiser, whereby the advertisement of that advertiser is posted in a predetermined conference hall. When insertion request mail is received from a plurality of advertisers, the server operation support apparatus determines the order according to the received order of the insertion request mail or in the descending order of a higher advertising fee, and posts the advertisement. The server operation support apparatus of the present embodiment can support the operation of the server by increasing the number of users connected to the server that operates an electronic conference system or the like to which an unspecified number of many users are connected through a network to provide information of high interest to the connecting user.

As mentioned before, determination can be made whether a user similar to a certain person in age and sex has accessed or not, based on the age and sex (FIG. 3) in the user information stored in user information storage unit 402 and conference hall information (FIG. 8) generated by conference monitor unit 312 (FIG. 8) without depending on the conference hall ID registered in advance by the user. The determination is based on the detected number of users accessing to each conference hall classified by age and sex for all the conference halls. In addition to providing notification when a client computer having personal information similar to the personal information of a user accesses the server, specific notification can be made. For example, when a male user in his thirties has registered for the access of a female in her twenties, access made by a user of these conditions may be notified to that male user.

Advertisement insertion confirmation mail can be transmitted again to the same advertiser, as described in the following, as an alternative to the process of S312 in FIG. 22. More specifically, when insertion request mail is not received within the reply waiting time, advertisement insertion confirmation mail can be transmitted again to the same advertiser with a lower advertising fee. The advertiser made aware that the advertising fee is reduced may decide to request insertion of an advertisement. By repeating such a process, advertisement for that conference hall can be maintained.

Furthermore, as an alternative to the process of S362 in FIG. 27, all the insertion request mails received before the elapse of the reply waiting time can be rearranged in the descending order of advertising fee. The advertisers from the higher advertising fee up to the number of advertisements in the conference hall are determined to be the advertisement candidate. In this case, the advertisement candidate data includes data of the conference hall ID, advertiser ID, advertising fee and advertisement text identification information for each advertisement insertion confirmation mail ID. In this case, the advertiser of advertiser ID=21 with the highest advertising fee is registered as the first advertisement candidate, and the advertiser of advertiser ID=14 with the next highest advertising fee is registered as the second advertisement candidate.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A server operation support apparatus supporting an operation of a server to which a plurality of client computers are connected through a network, said server providing conference services to users of said plurality of client computers and allowing insertion of an advertisement that can be viewed by said plurality of client computers when participating in a conference, said server operation support apparatus comprising:

storage for storing information on advertisements available for insertion to said server, an access status detector connected to said network for detecting an access status of said plurality of client computers to said server in connection with said conference, wherein detecting the access status includes determining the number of client computers participating in said conference, and an advertisement designator operably connected to said storage and said access status detector for designating insertion of one of said advertisements to said server according to said information on said advertisements in said storage, when said detected access status satisfies a predetermined condition.

2. The server operation support apparatus according to claim 1, wherein said predetermined condition includes a condition that a value calculated according to the number of accesses to said server is at least a predetermined value.

3. The server operation support apparatus according to claim 1, further comprising an advertising fee setter for setting an advertising fee according to said access status.

4. The server operation support apparatus according to claim 1, further comprising a communication system for communicating with said advertiser to receive advertisement data from said advertiser, wherein said designator designates insertion of an advertisement realized by said received advertisement data to said server.

5. The server operation support apparatus according to claim 1, further comprising a communication system for communicating with said advertiser, wherein said designator comprises a transmitter for transmitting insertion query information including insertion confirmation information confirming whether an advertisement is to be posted or not to the advertiser whose information is stored in said storage, when said access status detected by said detector satisfies a predetermined condition, and a system for suppressing an operation by said designator in response to not receiving an insertion request corresponding to said insertion query information within a predetermined period.

6. The server operation support apparatus according to claim 5, wherein said insertion query information includes access information indicating an access status detected by said detector.

7. The server operation support apparatus according to claim 5, wherein said transmitter for transmitting insertion query information transmits said insertion query information to a plurality of advertisers, wherein said predetermined condition includes a condition determined for each said advertiser.

8. The server operation support apparatus according to claim 7, further comprising an advertising fee setter for setting an advertising fee according to said access status for each said advertiser.

9. The server operation support apparatus according to claim 8, wherein said designator designates insertion of an advertisement to said server in a descending order of said advertising fee in response to reception of an insertion request from a plurality of said advertisers.

10. The server operation support apparatus according to claim 8, wherein said insertion query information comprises charge information indicating advertising fee set by said advertising fee setter.

11. A server operation support apparatus supporting an operation of a server to which a plurality of client computers are connected through a network, said server providing conference services to users of said plurality of client computers and allowing insertion of an advertisement that can be viewed by said plurality of client computers when participating in a conference, said server operation support apparatus comprising:

a storage circuit for storing information on advertisements available for insertion to said server, a detection circuit connected to said network for detecting an access status of said plurality of client computers to said server in connection with said conference, wherein detecting the access status includes determining the number of client computers participating in said conference, and a designation circuit operably connected to said storage circuit and said detection circuit for designating insertion of one of said advertisements to said server according to said information on said advertisements in said storage circuit, when said detected access status satisfies a predetermined condition.

12. The server operation support apparatus according to claim 11, wherein said predetermined condition includes a condition that a value calculated according to the number of accesses to said server is at least a predetermined value.

13. The server operation support apparatus according to claim 11, further comprising an advertising fee set circuit for setting an advertising fee according to said access status.

14. The server operation support apparatus according to claim 11, further comprising a communication circuit for communicating with said advertiser to receive advertisement data from said advertiser, wherein said designation circuit comprises a circuit for designating insertion of an advertisement realized by said received advertisement data to said server.

15. The server operation support apparatus according to claim 11, further comprising a communication circuit for communicating with said advertiser, wherein said designation circuit comprises a circuit for transmitting insertion query information including insertion confirmation information confirming whether an advertisement is to be posted or not to the advertiser whose information is stored in said storage circuit, when said access status detected by said detection circuit satisfies a predetermined condition, and a circuit for suppressing an operation by said designation circuit in response to not receiving an insertion request corresponding to said insertion query information within a predetermined period.

16. The server operation support apparatus according to claim 15, wherein said insertion query information includes access information indicating an access status detected by said detection circuit.

17. The server operation support apparatus according to claim 15, wherein said circuit for transmitting insertion query information comprises a circuit for transmitting said insertion query information to a plurality of advertisers, wherein said predetermined condition includes a condition determined for each said advertiser.

18. The server operation support apparatus according to claim 17, further comprising an advertising fee set circuit for setting an advertising fee according to said access status for each said advertiser.

19. The server operation support apparatus according to claim 18, wherein said designation circuit comprises a circuit for designating insertion of an advertisement to said server in a descending order of said advertising fee in response to reception of an insertion request from a plurality of said advertisers.

20. The server operation support apparatus according to claim 18, wherein said insertion query information comprises charge information indicating an advertising fee set by said advertising fee set circuit.

21. A method of supporting an operation of a server to which a plurality of client computers are connected through a network, said server providing conference services to users of said plurality of client computers and allowing insertion of an advertisement that can be viewed by said plurality of client computers when participating in a conference, said method comprising the steps of:
storing information on advertisements available for insertion to said server,
detecting an access status of said plurality of client computers to said server in connection with said conference, wherein detecting the access status includes determining the number of client computers participating in said conference, and
designating insertion of one of said advertisements to said server based on said information on said advertisements prepared when said detected access status satisfies a predetermined condition.

22. The server operation support method according to claim 21, wherein said predetermined condition includes a condition that a value calculated based on the number of accesses to said server is at least a predetermined number.

23. The method according to claim 21, further comprising the step of setting an advertising fee based on said access status.

24. The method according to claim 21, further comprising the step of communicating with said advertiser and receiving advertisement data from said advertiser,
wherein said step of designating insertion of an advertisement comprises the step of designating said server to post an advertisement realized by said received advertisement data.

25. The method according to claim 21, further comprising the step of communicating with said advertiser,
wherein said step of designating insertion of an advertisement comprises the steps of
transmitting insertion query information including insertion confirmation information confirming as to whether an advertisement is to be posted or not to said advertiser when said access status detected at said step of detecting an access status satisfies a predetermined condition, and
suppressing an operation at said step of detecting an access status in response to not receiving insertion request corresponding to said insertion query information within a predetermined period.

26. The method according to claim 25, wherein said insertion query information comprises access information indicating an access status detected at said step of detecting an access status.

27. The method according to claim 25, wherein said step of transmitting insertion query information comprises the step of transmitting said insertion query information to a plurality of advertisers,
wherein said predetermined condition includes a condition determined for each said advertiser.

28. The method according to claim 27, further comprising the step of setting an advertising fee based on said access status for each said advertiser.

29. The method according to claim 28, wherein said step of designating insertion of an advertisement comprises the step of designating insertion of an advertisement to said server in a descending order of said advertising fee in response to reception of an insertion request from a plurality of said advertisers.

30. The method according to claim 28, wherein said insertion query information comprises charge information indicating an advertising fee set at said step of setting an advertising fee.

31. A computer-readable recording medium recorded with a program realizing a method of supporting an operation of a server to which a plurality of client computers are connected through a network, said server providing conference services to users of said plurality of client computers and allowing insertion of an advertisement that can be viewed by said plurality of client computers when participating in a conference, said method comprising the steps of:
storing information on advertisements available for insertion to said server,
detecting an access status of said plurality of client computers to said server in connection with said conference, wherein detecting the access status includes determining the number of client computers participating in said conference, and
designating insertion of one of said advertisements to said server based on said information on said advertisements when said detected access status satisfies a predetermined condition.

* * * * *